US 7,142,269 B2

(12) United States Patent
Ikeno et al.

(10) Patent No.: US 7,142,269 B2
(45) Date of Patent: Nov. 28, 2006

(54) COLOR LIQUID CRYSTAL PANEL HAVING OPENING IN COLOR FILTER VARIED ACCORDING TO COLOR, METHOD FOR MANUFACTURING THE SAME, AND COLOR LIQUID CRYSTAL DISPLAY DEVICE EMPLOYING THE SAME

(75) Inventors: Hidenori Ikeno, Tokyo (JP); Eriko Fujimaki, Tokyo (JP)

(73) Assignees: NEC Corporation, Tokyo (JP); NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/983,195

(22) Filed: Nov. 8, 2004

(65) Prior Publication Data

US 2005/0062909 A1 Mar. 24, 2005

Related U.S. Application Data

(62) Division of application No. 10/122,342, filed on Apr. 16, 2002, now Pat. No. 6,897,922.

(30) Foreign Application Priority Data

Apr. 16, 2001 (JP) .............................. 2001-117041

(51) Int. Cl.
*G02F 1/1335* (2006.01)
(52) U.S. Cl. ...................... 349/109; 349/106; 349/113; 349/114
(58) Field of Classification Search ................ 349/106, 349/109, 113, 114
See application file for complete search history.

(56) References Cited

U.S. PATENT DOCUMENTS

| 5,642,176 A | * | 6/1997 | Abukawa et al. ........... 349/106 |
| 6,124,909 A | | 9/2000 | Miyashita et al. |
| 6,215,538 B1 | * | 4/2001 | Narutaki et al. ............ 349/106 |
| 6,380,995 B1 | * | 4/2002 | Kim .......................... 349/113 |
| 6,501,521 B1 | * | 12/2002 | Matsushita et al. ......... 349/106 |
| 2001/0004276 A1 | | 6/2001 | Urabe et al. |

FOREIGN PATENT DOCUMENTS

| JP | 10-154817 | 6/1998 |
| JP | 2000-111902 | 4/2000 |
| JP | 2000-162644 | 6/2000 |
| WO | 99/28782 | 6/1999 |

* cited by examiner

*Primary Examiner*—Andrew Schechter
*Assistant Examiner*—Michael H. Caley
(74) *Attorney, Agent, or Firm*—Young & Thompson

(57) ABSTRACT

Within a reflective display section R, a part of a light that reaches a reflective electrode through a color filter exits to the outside through slits and a part of a light that reaches the reflective electrode through the slits exits to the outside through the color filter. In addition, a light reaching the reflective electrode through the color filter and exiting to the outside through the color filter, and a light having no opportunity to pass through the slits also can be observed. Therefore, a mean film thickness of color filter through which all lights pass during the time in which they travel the associated distance after they are inputted to the inside until they are outputted to the outside becomes nearly equal to that could be observed in the transmissive section T.

2 Claims, 23 Drawing Sheets

(b)

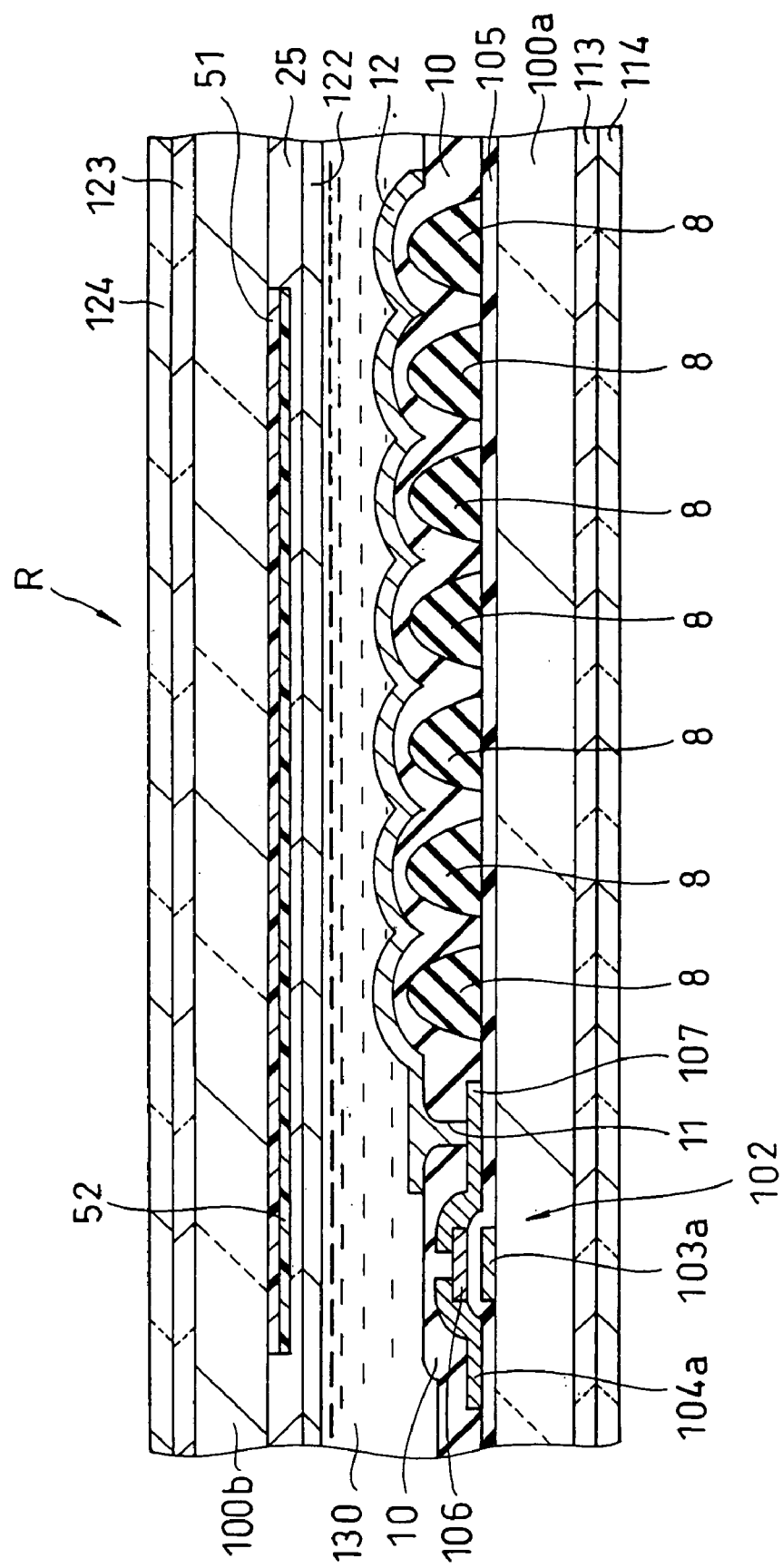

COLOR LIQUID CRYSTAL PANEL HAVING OPENING IN COLOR FILTER VARIED ACCORDING TO COLOR, METHOD FOR MANUFACTURING THE SAME, AND COLOR LIQUID CRYSTAL DISPLAY DEVICE EMPLOYING THE SAME

CROSS REFERENCE TO RELATED APPLICATIONS

This application is a division of application Ser. No. 10/122,342, filed on Apr. 16, 2002 now U.S. Pat. No. 6,897,922, the entire contents of which are hereby incorporated by reference.

BACKGROUND OF THE INVENTION

1. Technical Field of the Invention

The present invention relates to a color liquid crystal panel suitably used as a display of a portable telephone, a method for manufacturing the same, and further a color liquid crystal display device employing the same, more particularly, to a color liquid crystal panel having an enhanced capability of displaying high quality images, a method for manufacturing the same, and further a color liquid crystal display device employing the same.

2. Description of the Related Art

It is conventionally known that a semi-transmissive liquid crystal display device consisting of a plurality of pixels, each having a transmissive display section and a reflective display section therein, has been developed as a liquid crystal display device equipped with both features of a transmissive liquid crystal display device and a reflective liquid crystal display device. In such a semi-transmissive liquid crystal display device, a color filter for a transmissive display section and a color filter for a reflective display section are provided corresponding to each color to be displayed and therefore, totally six kinds of color filters are to be provided corresponding to each color. Accordingly, in order to manufacture a color liquid crystal display device having the above-described construction of color filter, it is necessary that six kinds of photoresist films are prepared corresponding to those color filters and then, six photolithography steps are carried out. Consequently, there has been found a drawback in that the semi-transmissive liquid crystal display device manufactured in accordance with the above-described method results in a low yield and high manufacturing cost thereof.

In consideration of the above-stated drawback, the following semi-transmissive liquid crystal display device has recently been disclosed in publications such as Japanese Patent Application Laid-open No. 2000-111902. That is, a semi-transmissive liquid crystal display device is constructed such that only one kind of color filter is formed corresponding to each color and a region in which no color filter exists is formed within a reflective display section.

FIG. 1 is a plan view illustrating a layout of a TFT substrate included in a conventional semi-transmissive liquid crystal display device disclosed in Japanese Patent Application Laid-open No. 2000-111902 and FIG. 2 is a cross sectional view of a liquid crystal panel employed in the conventional semi-transmissive liquid crystal display device, taken along the line A—A of FIG. 1.

In the conventional semi-transmissive liquid crystal display device disclosed in the publication, a red color pixel 101R, a green color pixel 101G and a blue color pixel 101B are disposed in this order in a direction in which a scanning signal line extends. In each pixel, a thin film transistor (TFT) 102 is formed. The thin film transistor 102 consists of a gate electrode 103a projecting from a gate line 103 as the scanning signal line and a drain electrode 104a projecting from a drain line 104 that extends in a direction perpendicular to the gate line. The gate line 103 and the gate electrode 103a are formed on a transparent substrate 100a and further, an insulation film 105 is formed on the transparent substrate 100a covering the gate line 103 and the gate electrode 103a. The drain line 104 is formed on the insulation film 105. An amorphous silicon layer 106 is formed on the insulation film 105 to face the gate electrode 103a and the drain electrode 104a is formed extending on the amorphous silicon layer 106. Furthermore, a source electrode 107 is formed extending from the amorphous silicon layer 106 in a direction apart from the drain electrode 104a while a part of the source electrode is at least positioned on and inside the amorphous silicon layer.

Within a reflective display section of each pixel, projecting portions 108 are formed on the insulation film 105 and within a transmissive display section, a transparent electrode 109 is formed on the insulation film 105. Note that the reflective display section is formed to surround the transmissive display section. Furthermore, within a region excluding the transmissive display section in each pixel, an insulation film 110 covering the projecting portions 108, the thin film transistor 102 and the like is formed and further, a contact hole 111 is formed in the insulation film 110 so as to reach the surface of the source electrode 107. A reflective electrode 112 is formed within the contact hole 111 and on the insulation film 105. The reflective electrode 112 has a convex-concave surface reflecting the profile of the projecting portions 108. The reflective electrode 112 is connected also to the transparent electrode 109. Furthermore, a retardation film 113 and a polarizer 114 are formed on the transparent substrate 100a on a side thereof defined as the surface on which elements such as the thin film transistor 102 are not formed. The elements constructed as described above constitute a TFT substrate.

Additionally, another transparent substrate 100b is disposed in parallel with the transparent substrate 100a on a side thereof defined as the surface on which the thin film transistor 102 is formed. A color filter (CF) 121 and an opposing electrode 122 are formed on a surface of the transparent substrate 100b on a side thereof facing the transparent substrate 100a. As shown in FIG. 1, the color filter 121 is formed extending in parallel with the drain line 104 and further, when viewing a pixel in a direction perpendicular to a surface of the associated transparent substrate, the transparent electrode 109 is being formed inside with respect to both end lines of the color filter 121 whereas the reflective electrode 112 is being formed to have a width extending beyond the both lines thereof. Furthermore, a retardation film 123 and a polarizer 124 are formed on the transparent substrate 100b on a side thereof defined as the surface on which elements such as the color filter 121 are not formed. The elements constructed as described above constitute a CF substrate.

In addition to the above-described construction of liquid crystal panel, a liquid crystal 130 is interposed between the TFT substrate and the CF substrate to constitute the liquid crystal panel.

The conventional color liquid crystal display device constructed as described above has one kind of color filter therein corresponding to each color and therefore, can be manufactured through a reduced number of process steps, thereby improving a yield thereof.

Furthermore, as the color filter 121 of the CF substrate employed in the above-described color liquid crystal display device has a region therein, facing the reflective electrode 112, in which the color filter 121 is not formed, the color liquid crystal display device can offer a display brightness greater than that could be achieved in a color liquid crystal display device developed before the emergence of color liquid crystal display device employing such construction of the color filter 121.

Moreover, the conventional reflective liquid crystal display device has projecting portions formed under the reflective electrode and extending in all directions. The projecting portions are designed to have a pattern optimal in terms of paths of an incident light and a reflected light. FIG. 3 illustrates a layout of projecting portions employed in the conventional liquid crystal display device. In a reflective liquid crystal display device, the projecting portions 108 are formed without especially taking into account the effect of boundaries between pixels. In addition, a liquid crystal display device having a transmissive display section and a reflective display section therein includes such projecting portions only within the reflective display section.

However, it has been found a problem in that the conventional semi-transmissive liquid crystal display device employing one kind of color filter corresponding to each pixel in order to, for example, reduce the number of process steps to be carried out to manufacture the device has an image quality inferior to that of a device employing two kinds of color filters therein, which has been developed before the emergence of the device employing one kind of color filter.

Furthermore, it has also been found another problem in that both a reflective liquid crystal display device and a semi-transmissive liquid crystal display device have displayed images appearing pale yellow in color thereon.

SUMMARY OF THE INVENTION

An object of the present invention is to provide a color liquid crystal panel capable of improving quality of images to be displayed in a semi-transmissive liquid crystal display device, a method for manufacturing the same, and further a color liquid crystal display device employing the same.

A color liquid crystal panel according to the first aspect of the present invention comprises a thin film transistor, a reflective electrode connected to the thin film transistor and a transparent electrode in each pixel thereof. Furthermore, the color liquid crystal panel is constructed such that a display surface of the color liquid crystal panel allows a light emitted from a backlight to exit from the display surface through the transparent electrode and another light inputted to the display surface to exit from the display surface after being reflected by the reflective electrode. Additionally, the color liquid crystal panel is constructed such that the color liquid crystal panel has a color filter therein so that at least one opening varying an area thereof depending on a color to be displayed is formed in the color filter in a part thereof facing the reflective electrode, and color reproduction ranges of the light exiting from the display surface through the transparent electrode and the another light exiting from the display surface after being reflected by the reflective electrode substantially coincide with each other.

It should be noted that the color liquid crystal panel of the first aspect of the present invention is further and preferably constructed as follows. That is, a red color filter, a green color filter and a blue color filter are respectively formed as the color filter and a ratio of an area of the at least one opening formed in the color filter with respect to an area of the color filter becomes maximum in the event the green color filter is selected as the color filter to calculate the ratio. The color liquid crystal panel is more preferably constructed as follows. That is, in the case where a white-colored light source is employed as the backlight, the ratio of an area of the at least one opening formed in the green color filter with respect to an area of the green color filter is made two to four times the ratio of an area of the at least one opening formed in one of the red color filter and the blue color filter with respect to an area of associated one of the red color filter and the blue color filter.

Additionally, the color liquid crystal panel of the first aspect of the present invention described so far is preferably constructed as follows. That is, the ratio of an area of the at least one opening formed in the color filter with respect to an area of the color filter in the color filter in a part thereof facing the reflective electrode is set at a value of not greater than 50% and further, the at least one opening is formed shaped like a slit and a width of the slit is set at a value of 1 μm to 10 μm.

A color liquid crystal panel constructed in accordance with the second aspect of the present invention has a thin film transistor, a reflective electrode connected to the thin film transistor and a transparent electrode in each pixel thereof. Furthermore, the color liquid crystal panel is constructed such that a display surface of the color liquid crystal panel allows a light emitted from a backlight to exit from the display surface through the transparent electrode and another light inputted to the display surface to exit from the display surface after being reflected by the reflective electrode. Additionally, the color liquid crystal panel comprises a color filter and a transparent film formed between the color filter and a transparent substrate while varying a volume thereof depending on a color to be displayed, in which color reproduction ranges of the light exiting from the display surface through the transparent electrode and the another light exiting from the display surface after being reflected by the reflective electrode substantially coincide with each other.

A color liquid crystal panel constructed in accordance with the third aspect of the present invention comprises a transparent substrate, a thin film transistor formed in each pixel on the transparent substrate, an insulation film formed on the transparent substrate to have a convex-concave surface within the each pixel, a reflective electrode formed on the insulation film and connected to the thin film transistor in the each pixel, in which the insulation film has projecting portions each extending along a boundary between adjacent pixels and having a width substantially equal to that of projecting portions constituting the convex-concave surface within the each pixel.

To solve the above-described problems, the inventors of the application have energetically and repeatedly carried out experiments and studies, and finally found the following problems included in the conventional technology that is disclosed such as in Japanese Patent Application Laid-open No. 2000-111902. That is, in a transmissive and reflective liquid crystal display device having one kind of color filter formed corresponding to a color to be displayed, respective patterns of openings formed in associated color filters coincide with each other even though human visual sensitivity varies depending on a color to be displayed. Accordingly, this construction of color filter having such opening therein makes the color reproduction ranges of a transmissive display section and a reflective display section within a pixel different from each other, thereby preventing the transmissive and reflective liquid crystal display device from offering the desirable quality of images to be displayed. Taking into account an adverse effect on the quality of images to be displayed, the present invention has been conceived to have the following construction of liquid crystal panel. That is, as described above, an area of openings formed in a color filter within a reflective display section is made to vary depending on a color to be displayed or a transparent film is formed between a color filter and a transparent substrate while varying the volume of the transparent film depending on a color to be displayed. This construction of liquid crystal panel makes the color reproduction ranges of a transmissive display section and a reflective display section coincide with each other corresponding to a color to be displayed, in other words, with respect to individual colors to be displayed, thereby creating color balanced viewable images corresponding to a color to be displayed, in other words, with respect to individual colors to be displayed, and further achieving high quality images.

Furthermore, the inventors found that images appearing pale yellow in color are caused by the difference in gaps between two substrates at positions thereof located within a pixel and between pixels. Normally in a reflective liquid crystal display device, a black matrix is not formed at the boundary between pixels to make a display bright. For this reason, it is believed that the above-described difference in gaps makes a light travel different distances through a liquid crystal to generate phase difference of light, making images appear pale yellow in color. Therefore, the liquid crystal panel of the present invention is constructed such that projecting portions are formed also at the boundary between pixels to reduce the difference in gaps to thereby reduce pale yellow in color and achieve high quality images.

A method for manufacturing a color liquid crystal panel according to the present invention is constructed as follows. First, the color liquid crystal panel has a thin film transistor, a reflective electrode connected to the thin film transistor and a transparent electrode in each pixel thereof, and is further constructed such that a display surface of the color liquid crystal panel allows a light emitted from a backlight to exit from the display surface through the transparent electrode and another light inputted to the display surface to exit from the display surface after being reflected by the reflective electrode. Secondly, the method for manufacturing the above-described color liquid crystal panel comprises the steps of: preparing a photomask in such a manner that at least one opening is formed in the photomask so as to vary an area of the at least one opening depending on a color to be displayed; and forming the pattern in a raw material film constituting the color filter by using the photomask to make the color filter have the at least one opening therein varying depending on a color to be displayed and facing the reflective electrode.

It should be noted that it is preferable for the method for manufacturing a color liquid crystal panel to further have a step of forming a transparent film covering all color filters formed corresponding to colors to be displayed and a step of flattening the transparent film after a step of forming the color filter.

According to the above-described method for manufacturing a color liquid crystal panel, the color liquid crystal panel constructed in accordance with the first aspect of the present invention and capable of displaying high quality images can be fabricated.

Moreover, a color liquid crystal display device of the present invention comprises a liquid crystal panel constructed in accordance with one of the first, second and third aspects of the present invention.

BRIEF DESCRIPTION OF THE DRAWINGS

FIG. 14 is a cross sectional view, taken along the line A—A of FIG. 4, of a liquid crystal panel of the second embodiment constructed in accordance with the present invention;

DETAILED DESCRIPTION OF THE PREFERRED EMBODIMENTS

Figure 1:
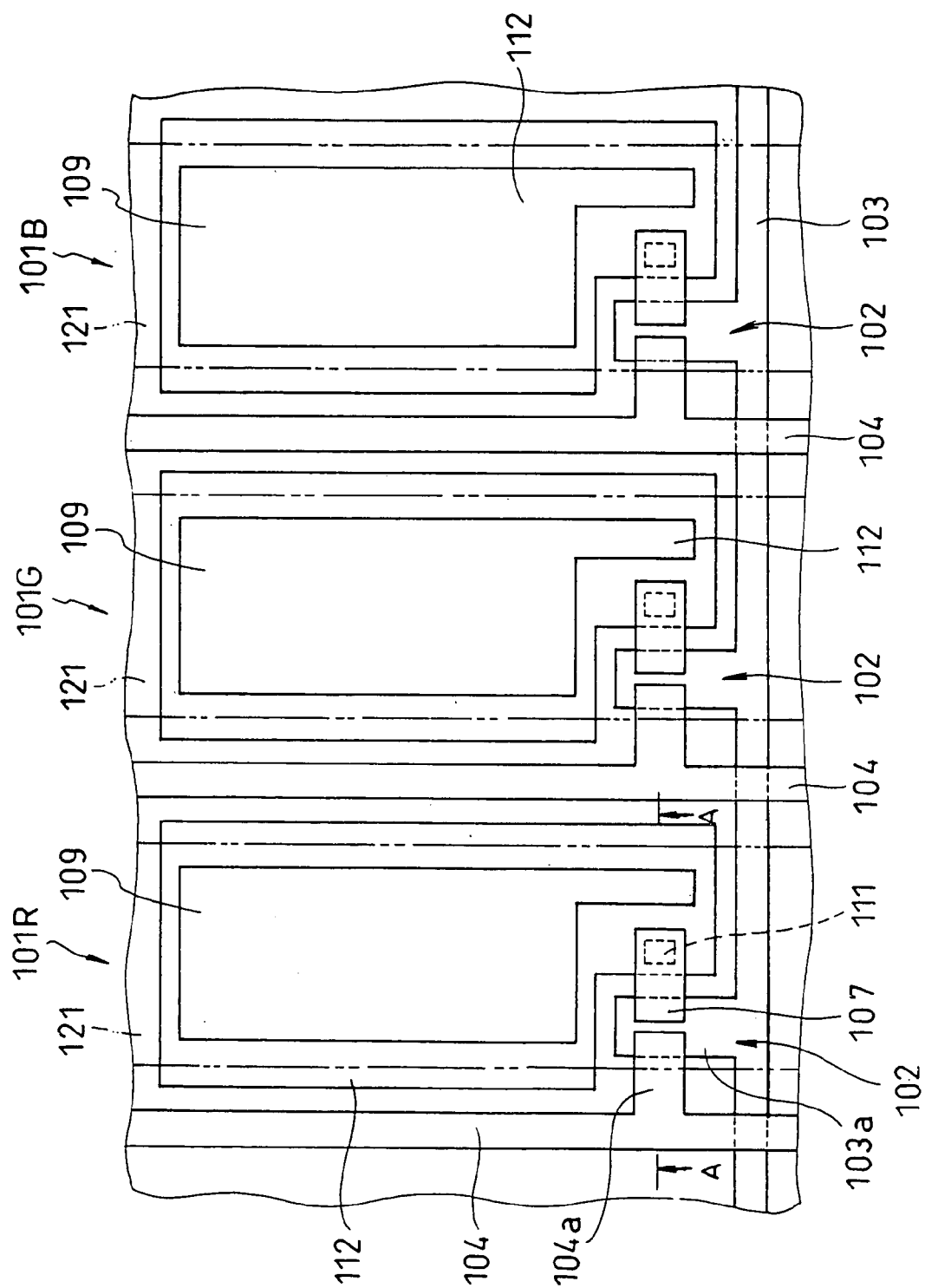
FIG. 1 is a plan view illustrating a layout of a TFT substrate included in a conventional semi-transmissive liquid crystal display device disclosed in Japanese Patent Application Laid-open No. 2000-111902.
Figure 2:
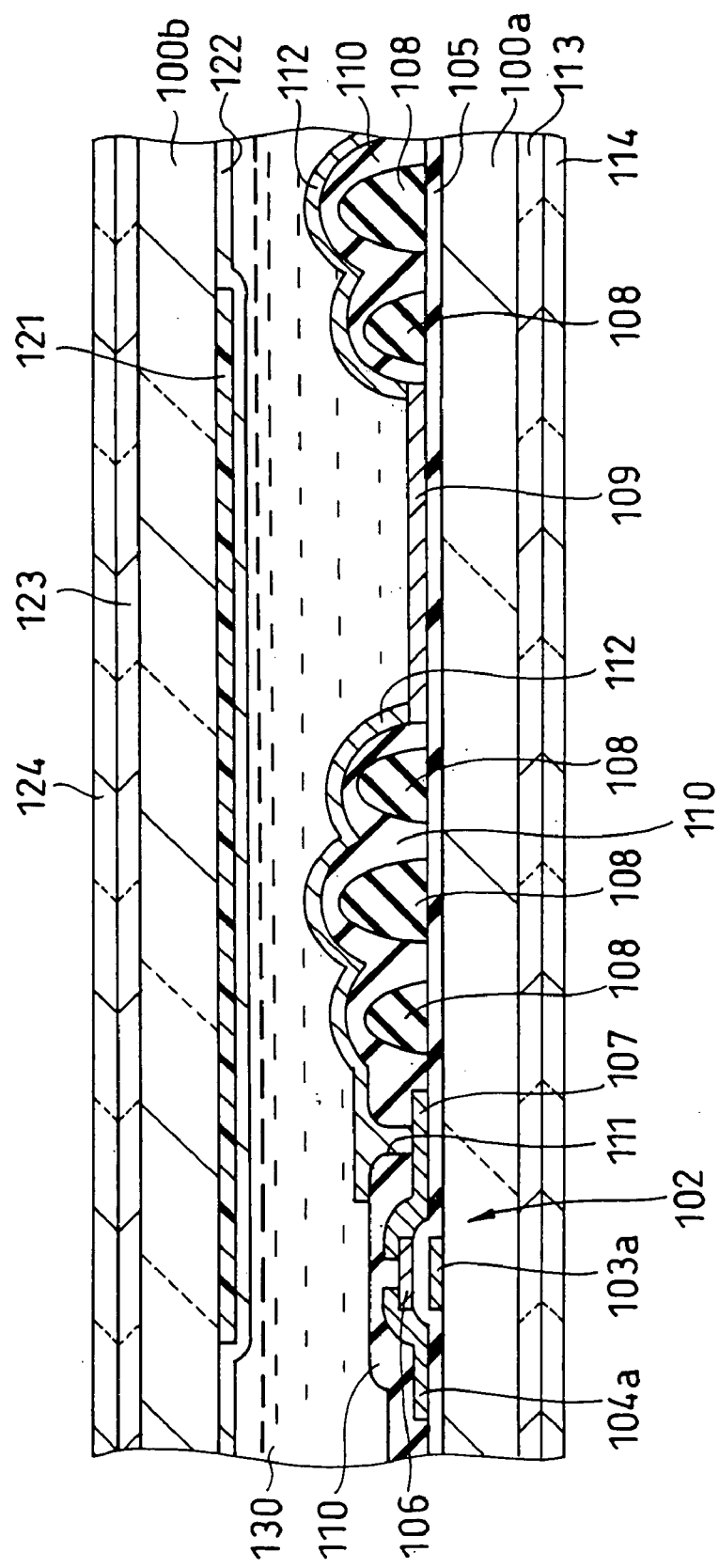
FIG. 2 is a cross sectional view of a liquid crystal panel employed in the conventional semi-transmissive liquid crystal display device, taken along the line A—A of FIG. 1.
Figure 3:
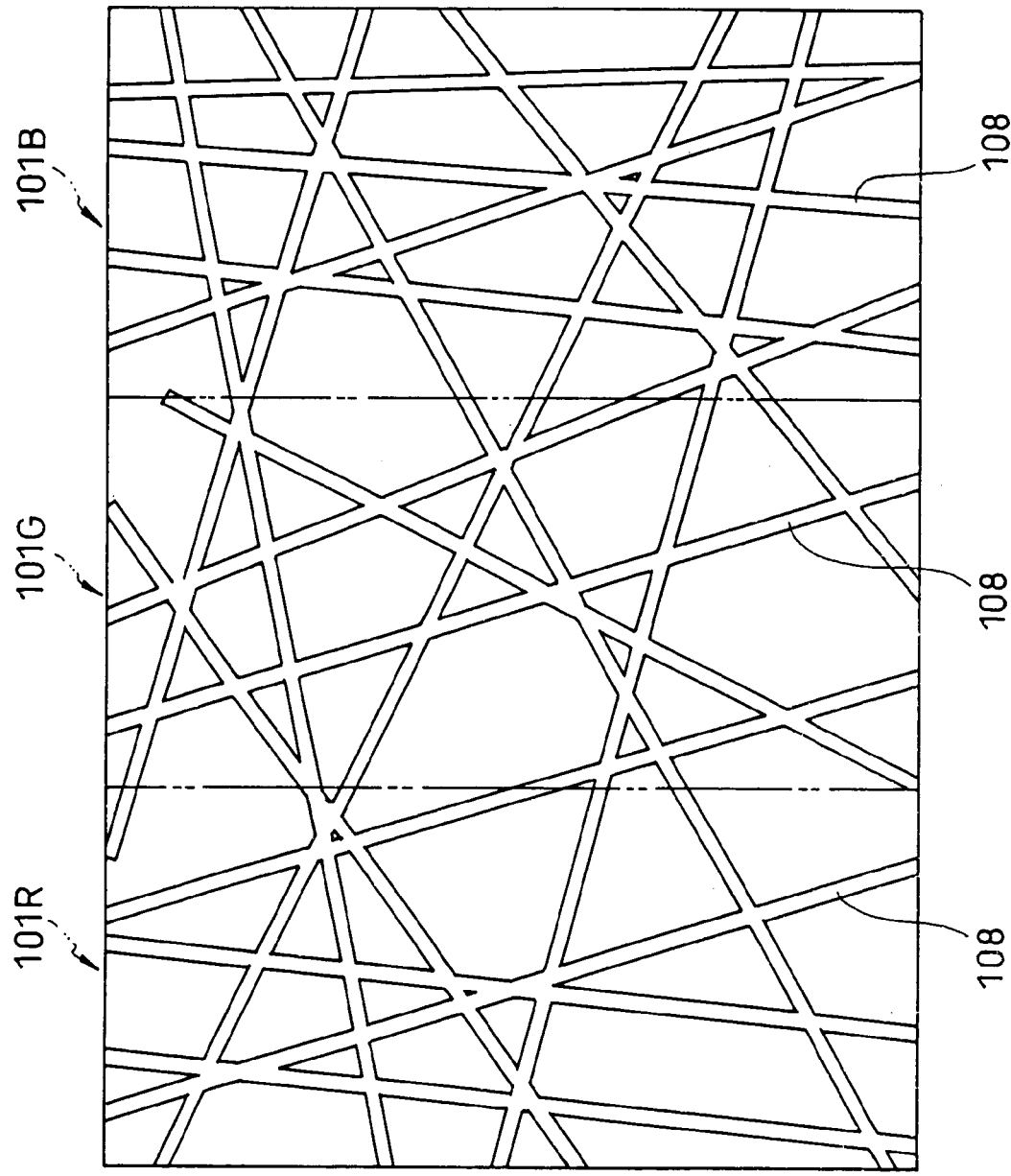
FIG. 3 illustrates a layout of projecting portions employed in the conventional liquid crystal display device.
Figure 4:
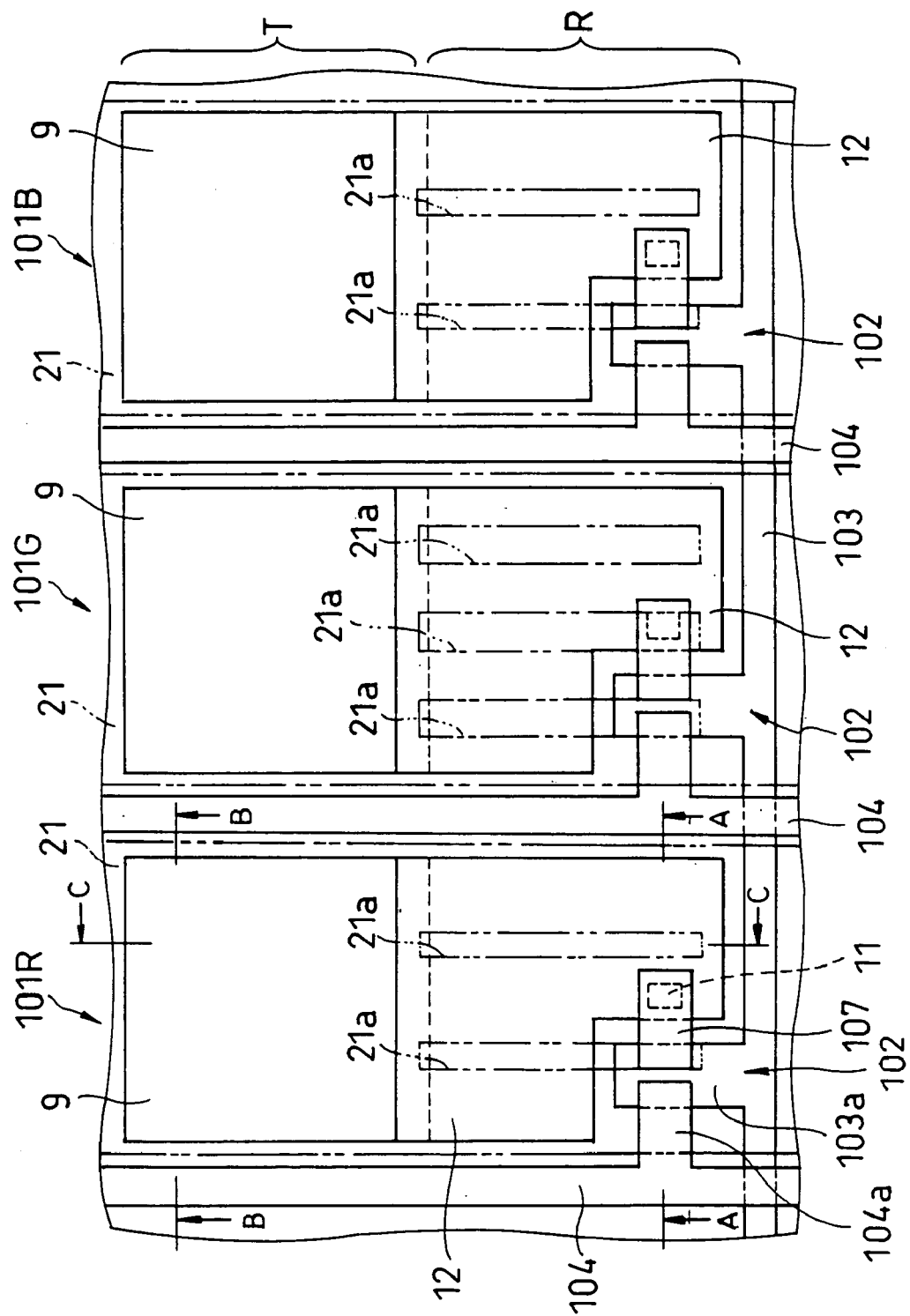
FIG. 4 is a plan view of a layout of a TFT substrate employed in a liquid crystal panel of the first embodiment constructed in accordance with the present invention.
Figure 5:
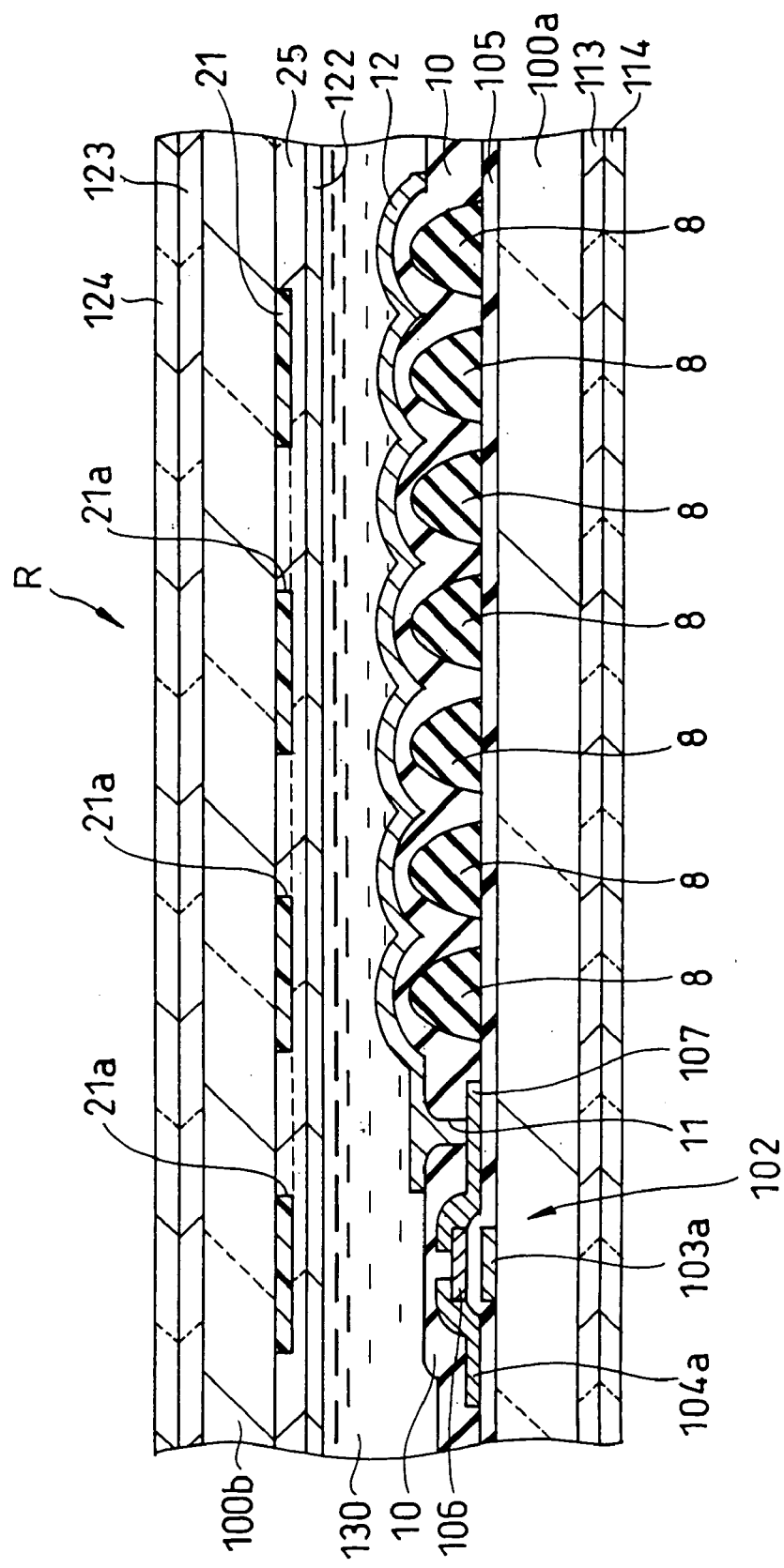
FIG. 5 is a cross sectional view taken along the line A—A of FIG. 4.
Figure 6:
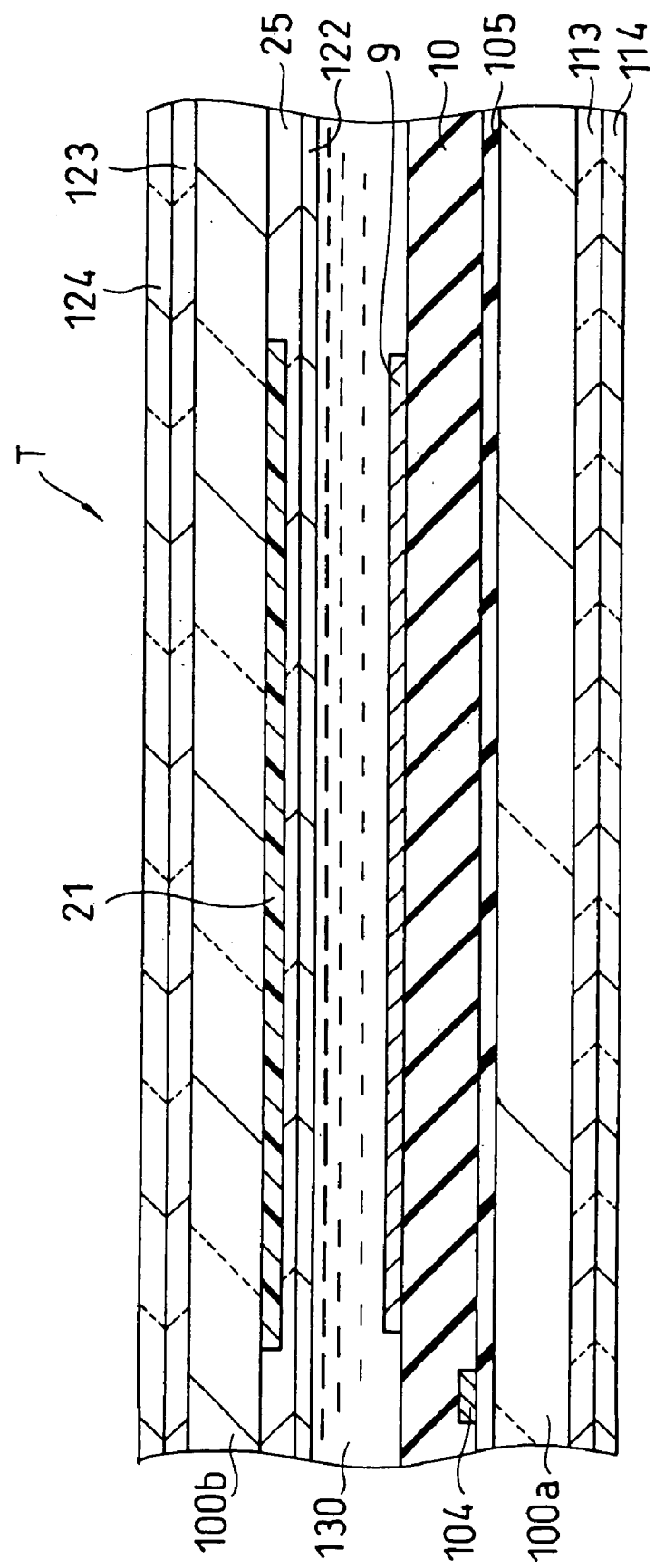
FIG. 6 is a cross sectional view taken along the line B—B of FIG. 4.
Figure 7:
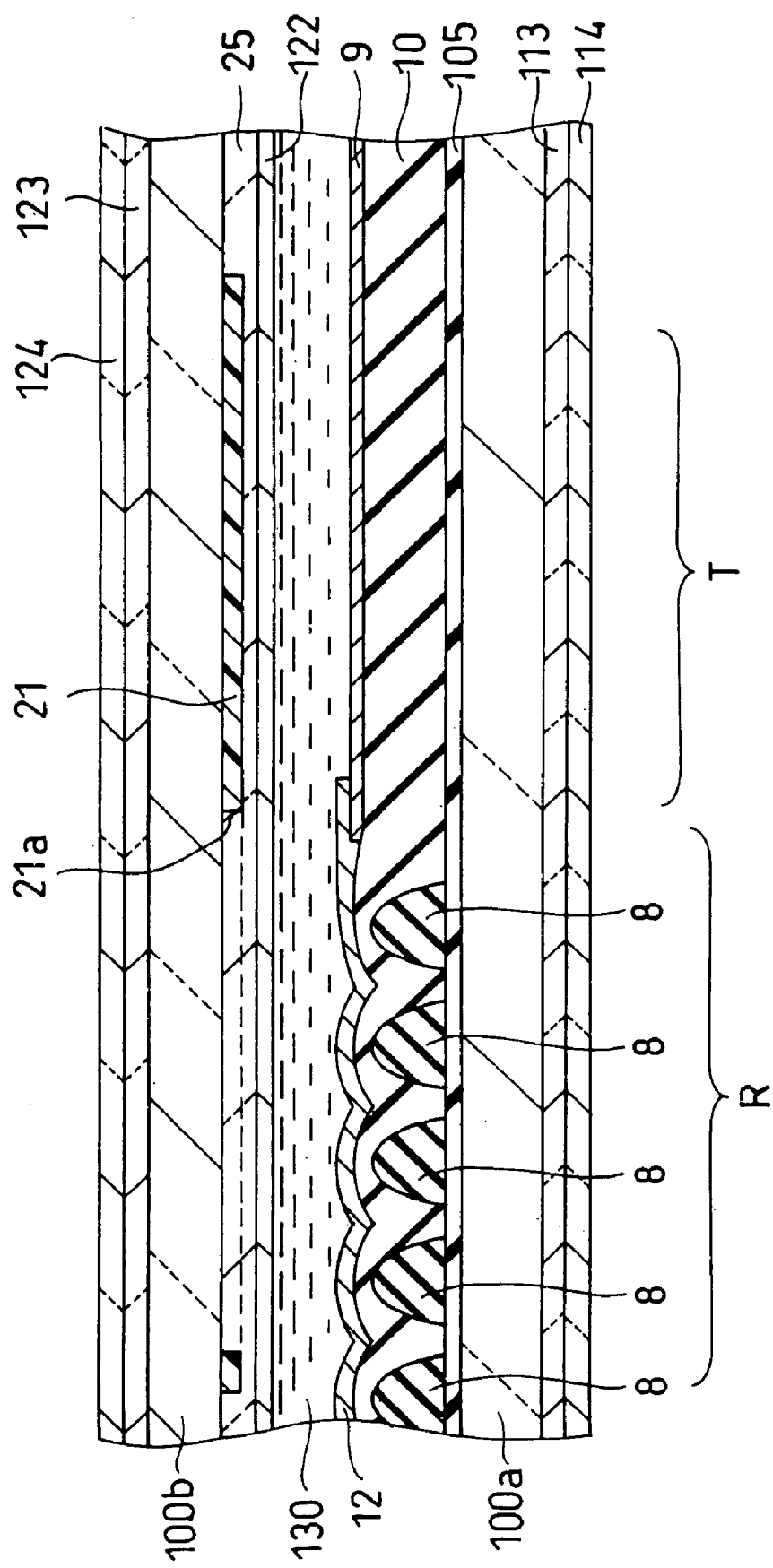
FIG. 7 is a cross sectional view taken along the line C—C of FIG. 4.

A liquid crystal panel constructed in accordance with embodiments of the present invention, a method for manufacturing the same and a liquid crystal display device employing the same will be described in detail below with reference to the attached drawings. FIG. 4 is a plan view of a layout of a TFT substrate employed in a liquid crystal panel constructed in accordance with the first embodiment of the present invention. FIG. 5 is a cross sectional view taken along the line A—A of FIG. 4, FIG. 6 is a cross sectional view taken along the line B—B of FIG. 4 and FIG. 7 is a cross sectional view taken along the line C—C of FIG. 4.

The first embodiment also employs the following construction of liquid crystal panel similar to that described in the conventional liquid crystal display device. That is, the liquid crystal panel of the first embodiment is constructed such that a red color pixel 101R, a green color pixel 101G and a blue color pixel 101B are disposed in this order in a direction in which a scanning signal line extends. In each pixel, a thin film transistor (TFT) 102 is formed. The thin film transistor 102 consists of a gate electrode 103a projecting from a gate line 103 as the scanning signal line and a drain electrode 104a projecting from a drain line 104 that extends in a direction perpendicular to the gate line. The gate line 103 and the gate electrode 103a are formed on a transparent substrate 100a and further, an insulation film 105 is formed on the transparent substrate 100a covering the gate line 103 and the gate electrode 103a. The drain line 104 is formed on the insulation film 105. An amorphous silicon layer 106 is formed on the insulation film 105 to face the gate electrode 103a and the drain electrode 104a is formed extending on the amorphous silicon layer 106. Furthermore, a source electrode 107 is formed extending from the amorphous silicon layer 106 in a direction apart from the drain electrode 104a while a part of the source electrode is at least positioned on and inside the amorphous silicon layer.

Furthermore, in the embodiment, each pixel is partitioned into, for instance, nearly two equal sections, i.e., a reflective display section R and a transmissive display section T, by a line extending in parallel with the scanning signal line. In this case, the reflective display section R is disposed in a pixel in a section thereof including the thin film transistor 102.

Moreover, within the reflective display section R of each pixel, projecting portions 8 are formed on the insulation film 105. The projecting portions 8 consist of, for example, an insulation film. In addition, an insulation film 10 is formed covering the projecting portions 8, the thin film transistor 102 and the like and further, a contact hole 11 is formed in the insulation film 10 so as to reach the surface of the source electrode 107. Furthermore, in the reflective display section R, a reflective electrode 12 is formed within the contact hole 11 and on the insulation film 10. The reflective electrode 12 has a convex-concave surface reflecting the profile of the projecting portions 8. On the other hand, within the transmissive display section T, a transparent electrode 9 is formed on the insulation film 10 and the reflective electrode 12 and the transparent electrode 9 overlap each other around the boundary between the reflective display section R and the transmissive display section T. Additionally, a retardation film 113 and a polarizer 114 are formed on the transparent substrate 100a on a side thereof defined as the surface on which elements such as the thin film transistor 102 are not formed. The elements constructed as described above constitute a TFT substrate.

Moreover, another transparent substrate 100b is disposed in parallel with the transparent substrate 100a on a side thereof defined as the surface on which the thin film transistor 102 is formed. A color filter (CF) 21 is formed on a surface of the transparent substrate 100b on a side thereof facing the transparent substrate 100a. As shown in FIGS. 4 through 7, the color filter 21 is formed extending in parallel with the drain line 104 and further, when viewing a pixel in a direction perpendicular to a surface of the associated transparent substrate, the transparent electrode 9 and the reflective electrode 12 are formed inside with respect to both end lines of the color filter 21. In addition, within the reflective display section R, slits 21a are formed in the color filter 21. The slits 21a are formed to have a width of, for instance, 1 μm to 10 μm and further, to occupy, for instance, below 50% of an area of the color filter 21 within the reflective display section R. Note that the ratio of an area occupied by the slits 21a with respect to an area of the color filter 21 within the reflective display section R varies depending on a color to be displayed and in the embodiment, the ratio of an area occupied by the slits 21a that are formed in the green color pixel 101G is made, for example, three times the respective ratio of an area occupied by the slits 21a that are formed in the red color pixel 101R and the blue color pixel 101B. Note that although the embodiment is constructed such that the slits 21a are formed extending in a direction in parallel with the color filter 21, the embodiment is not limited to the above-described construction of slits and therefore, may be constructed by employing another slits that have patterns different from that of the slits 21a.

Furthermore, an overcoat layer 25 is formed on the transparent substrate 100b filling the slits 21a while covering the color filter 21 and an opposing electrode 122 is formed on the overcoat layer 25. The overcoat layer 25 consists of, for example, a transparent resin and the opposing electrode 122 consists of, for example, an ITO (Indium Tin Oxide). A retardation film 123 and a polarizer 124 are formed on a surface of the transparent substrate 100b on a side thereof defined as the surface on which elements such as the color filter 21 are not formed. The elements constructed as described above constitute a CF substrate.

Subsequently, a liquid crystal 130 is interposed between the TFT substrate and the CF substrate.

In the first embodiment constructed as described above, in the transmissive display section T, a light emitted from a backlight (not shown) exits to the outside through the color filter 21. In the reflective display section R, a part of a light reaching the reflective electrode 12 through the color filter 21 exits to the outside through the slits 21a and a part of a light reaching the reflective electrode 12 through the slits 21a exits to the outside through the color filter 21. Also, the following phenomenon can be seen in the reflective display section R. That is, a light reaching the reflective electrode 12 through the color filter 21 exits to the outside through the color filter 21 and a light reaching the reflective electrode 12 through the slits 21a exits to the outside through the slits 21a. Therefore, a mean film thickness of a color filter through which lights exiting from the reflective display section R transmit during the time in which the lights travel the associated distance after they are inputted to the inside until they are outputted to the outside becomes nearly equal to that could be observed in the transmissive region T. In addition, as the embodiment employs the ratio of an area of the slits 21a with respect to an area of the color filter within the reflective display section R (hereinafter, the ratio is referred to as "aperture ratio") varying depending on a color to be displayed, it is possible to make the color reproduction ranges of the reflective display section R and the transmissive display section T coincide with each other with respect to a color to be displayed. As a result, the color liquid crystal display panel constructed as described above can display high quality images.

Subsequently, the relationship between an aperture ratio and a color balance will be explained below.

Figure 8:
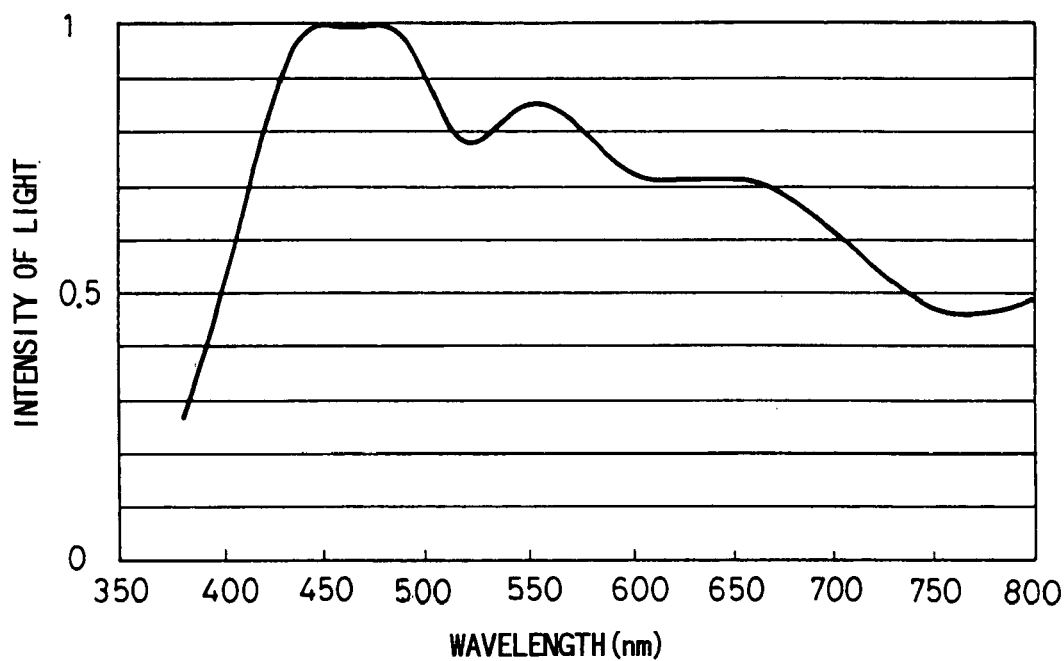
FIG. 8 is a graphic illustration of a spectrum of a standard light CIE "C"
Figure 9:
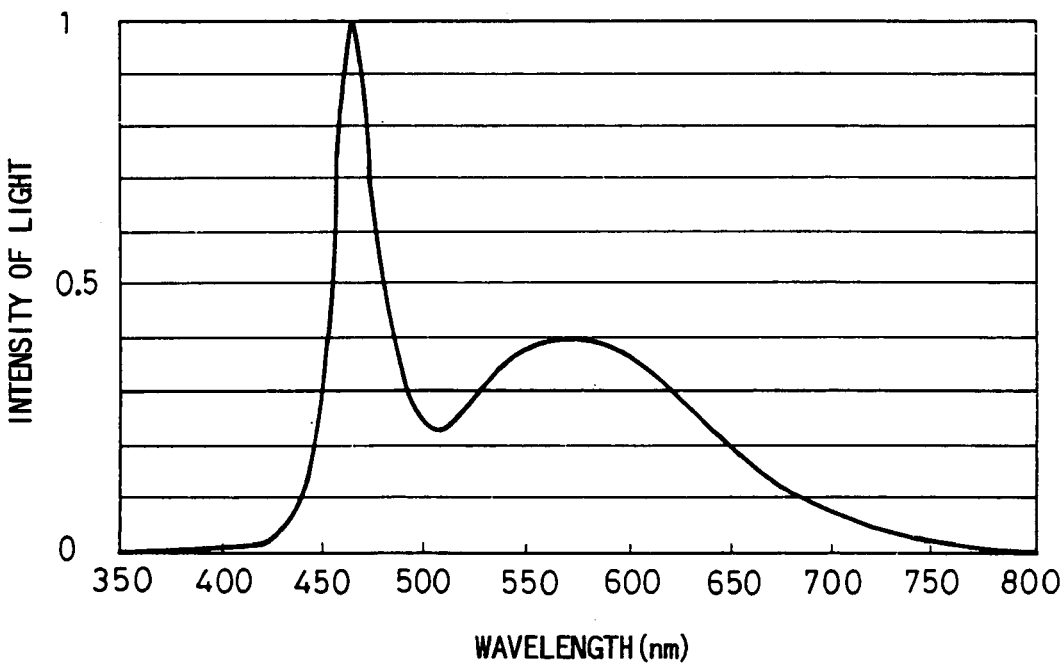
FIG. 9 is a graphic illustration of a spectrum of a light emitted from a white-colored LED.

The inventors of this application carried out a simulation in the following manner to make the above-described relationship clearer: first, decide to use a white-colored light emitting diode (LED) as a backlight; secondly, vary the film thickness of color filter; thirdly, with respect to various film thicknesses of color filter, calculate the aperture ratio so as to take the value for allowing chromaticity coordinates of the transmissive display section to substantially match to the CIE (Center for International Education) chromaticity coordinates of a white display. In this case, a standard light CIE "C" was used as a light incident on the reflective display section. FIG. 8 is a graphic illustration of a spectrum of the standard light CIE "C" and FIG. 9 is a graphic illustration of a spectrum of a light emitted from a white-colored LED. Note that an intensity of light along the longitudinal axis shown in FIGS. 8 and 9 is normalized such that the maximum intensity of light takes the value of one. The results obtained by carrying out the above-mentioned simulation will be illustrated in the following Tables 1 through 7.

TABLE 1

Film thickness 0.8 μm

| | Hue | Aperture ratio | x coordinate value | y coordinate value | NTSC ratio |
|---|---|---|---|---|---|
| Transmissive display section | Red | — | 0.417 | 0.328 | |
| | Green | — | 0.329 | 0.377 | |
| | Blue | — | 0.229 | 0.288 | |
| | White | — | 0.321 | 0.366 | 0.040 |
| Reflective display section (having optimal slits) | Red | 0.20 | 0.417 | 0.319 | |
| | Green | 0.38 | 0.319 | 0.378 | |
| | Blue | 0.27 | 0.239 | 0.288 | |
| | White | — | 0.318 | 0.334 | 0.042 |
| Reflective display section (having no slits) | Red | 0 | 0.487 | 0.306 | |
| | Green | 0 | 0.316 | 0.417 | |
| | Blue | 0 | 0.171 | 0.247 | |
| | White | — | 0.311 | 0.336 | 0.142 |

TABLE 2

Film thickness 1.0 μm

| | Hue | Aperture ratio | x coordinate value | y coordinate value | NTSC ratio |
|---|---|---|---|---|---|
| Transmissive display section | Red | — | 0.430 | 0.328 | |
| | Green | — | 0.328 | 0.385 | |
| | Blue | — | 0.217 | 0.279 | |
| | White | — | 0.321 | 0.337 | 0.054 |
| Reflective display section (having optimal slits) | Red | 0.18 | 0.430 | 0.320 | |
| | Green | 0.37 | 0.318 | 0.385 | |
| | Blue | 0.24 | 0.231 | 0.280 | |
| | White | — | 0.318 | 0.335 | 0.055 |
| Reflective display section (having no slits) | Red | 0 | 0.508 | 0.308 | |
| | Green | 0 | 0.314 | 0.435 | |
| | Blue | 0 | 0.161 | 0.236 | |
| | White | — | 0.311 | 0.341 | 0.183 |

TABLE 3

Film thickness 1.2 μm

| | Hue | Aperture ratio | x coordinate value | y coordinate value | NTSC ratio |
|---|---|---|---|---|---|
| Transmissive display section | Red | — | 0.443 | 0.328 | |
| | Green | — | 0.328 | 0.393 | |
| | Blue | — | 0.206 | 0.271 | |
| | White | — | 0.320 | 0.338 | 0.069 |
| Reflective display section (having optimal slits) | Red | 0.17 | 0.440 | 0.322 | |
| | Green | 0.36 | 0.317 | 0.392 | |
| | Blue | 0.20 | 0.219 | 0.271 | |
| | White | — | 0.317 | 0.336 | 0.069 |
| Reflective display section (having no slits) | Red | 0 | 0.527 | 0.310 | |
| | Green | 0 | 0.311 | 0.451 | |
| | Blue | 0 | 0.153 | 0.227 | |
| | White | — | 0.311 | 0.345 | 0.224 |

TABLE 4

Film thickness 1.4 μm

| | Hue | Aperture ratio | x coordinate value | y coordinate value | NTSC ratio |
|---|---|---|---|---|---|
| Transmissive display section | Red | — | 0.455 | 0.328 | |
| | Green | — | 0.327 | 0.401 | |
| | Blue | — | 0.196 | 0.263 | |
| | White | — | 0.319 | 0.338 | 0.086 |
| Reflective display section (having optimal slits) | Red | 0.15 | 0.454 | 0.323 | |
| | Green | 0.35 | 0.316 | 0.398 | |
| | Blue | 0.15 | 0.204 | 0.258 | |
| | White | — | 0.316 | 0.336 | 0.088 |
| Reflective display section (having no slits) | Red | 0 | 0.544 | 0.313 | |
| | Green | 0 | 0.309 | 0.467 | |
| | Blue | 0 | 0.147 | 0.219 | |
| | White | — | 0.311 | 0.348 | 0.264 |

TABLE 5

Film thickness 1.6 μm

| | Hue | Aperture ratio | x coordinate value | y coordinate value | NTSC ratio |
|---|---|---|---|---|---|
| Transmissive display section | Red | — | 0.473 | 0.329 | — |
| | Green | — | 0.327 | 0.408 | — |
| | Blue | — | 0.185 | 0.252 | — |
| | White | — | 0.319 | 0.339 | 0.108 |
| Reflective display section (having optimal slits) | Red | 0.12 | 0.476 | 0.324 | — |
| | Green | 0.31 | 0.314 | 0.409 | — |
| | Blue | 0.14 | 0.200 | 0.251 | — |
| | White | — | 0.317 | 0.339 | 0.111 |
| Reflective display section (having no slits) | Red | 0 | 0.566 | 0.316 | — |
| | Green | 0 | 0.306 | 0.482 | — |
| | Blue | 0 | 0.141 | 0.209 | — |
| | White | — | 0.312 | 0.353 | 0.310 |
| Reflective display section (having constant aperture ratio regardless of a color to be displayed) | Red | 0.20 | 0.440 | 0.327 | — |
| | Green | 0.20 | 0.312 | 0.429 | — |
| | Blue | 0.20 | 0.218 | 0.264 | — |
| | White | — | 0.316 | 0.346 | 0.097 |

TABLE 6

Film thickness 1.8 μm

| | Hue | Aperture ratio | x coordinate value | y coordinate value | NTSC ratio |
|---|---|---|---|---|---|
| Transmissive display section | Red | — | 0.490 | 0.330 | — |
| | Green | — | 0.326 | 0.416 | — |
| | Blue | — | 0.175 | 0.243 | — |
| | White | — | 0.319 | 0.340 | 0.131 |
| Reflective display section (having optimal slits) | Red | 0.11 | 0.488 | 0.327 | — |
| | Green | 0.30 | 0.313 | 0.414 | — |
| | Blue | 0.11 | 0.189 | 0.240 | — |
| | White | — | 0.317 | 0.340 | 0.130 |
| Reflective display section (having no slits) | Red | 0 | 0.584 | 0.320 | — |
| | Green | 0 | 0.304 | 0.496 | — |
| | Blue | 0 | 0.136 | 0.201 | — |
| | White | — | 0.312 | 0.356 | 0.354 |

TABLE 7

Film thickness 2.0 μm

| | Hue | Aperture ratio | x coordinate value | y coordinate value | NTSC ratio |
|---|---|---|---|---|---|
| Transmissive display section | Red | — | 0.506 | 0.331 | — |
| | Green | — | 0.325 | 0.423 | — |
| | Blue | — | 0.167 | 0.234 | — |
| | White | — | 0.319 | 0.341 | 0.154 |
| Reflective display section (having optimal slits) | Red | 0.09 | 0.506 | 0.328 | — |
| | Green | 0.28 | 0.312 | 0.421 | — |
| | Blue | 0.10 | 0.186 | 0.234 | — |
| | White | — | 0.318 | 0.343 | 0.152 |
| Reflective display section (having no slits) | Red | 0 | 0.599 | 0.323 | — |
| | Green | 0 | 0.301 | 0.508 | — |
| | Blue | 0 | 0.133 | 0.194 | — |
| | White | — | 0.313 | 0.360 | 0.394 |

Figure 10:
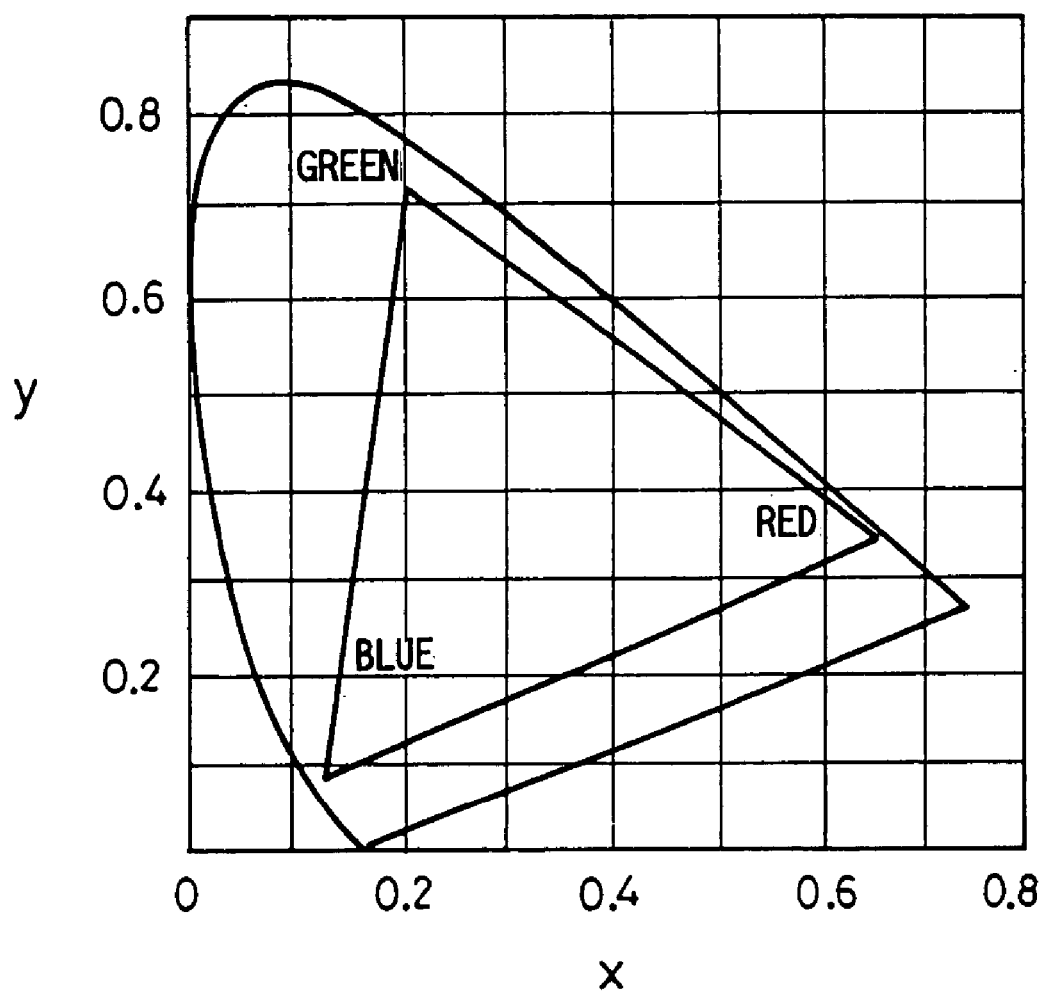
FIG. 10 is a CIE chromaticity diagram showing an optimal color reproduction range to be employed in television display and defined by NTSC.

It should be noted that the NTSC ratio is a ratio of an area of a color reproduction range of the associated display section with respect to an area of a color reproduction range most suitable for television display and defined by NTSC (National Television System Committee). FIG. 10 is a CIE chromaticity diagram showing a color reproduction range most suitable for television display and defined by NTSC.

As shown in the above-described Tables 1 through 7, in a case where slits are formed in the color filter to make the color filter have the appropriate aperture ratio, the chromaticity coordinates and NTSC ratio calculated with respect to the transmissive display section substantially match to those calculated with respect to the reflective display section. On the other hand, in a case where slits are not formed in the color filter within the reflective display section, the chromaticity coordinates and NTSC ratio calculated with respect to the transmissive display section are extensively different from those calculated with respect to the reflective display section. Furthermore, also in a case where slits are formed in the color filter to make the color filter have the same aperture ratio within the reflective display section regardless of a color to be displayed, as shown in Table 5, difference in the color reproduction ranges of respective display sections is not large. However, as the saturations of color observed in a green color pixel increase whereas the saturations of color observed in a red color pixel and a blue color pixel decrease, difference in respective hues observed in the transmissive display section and the reflective display section results.

Figure 11:
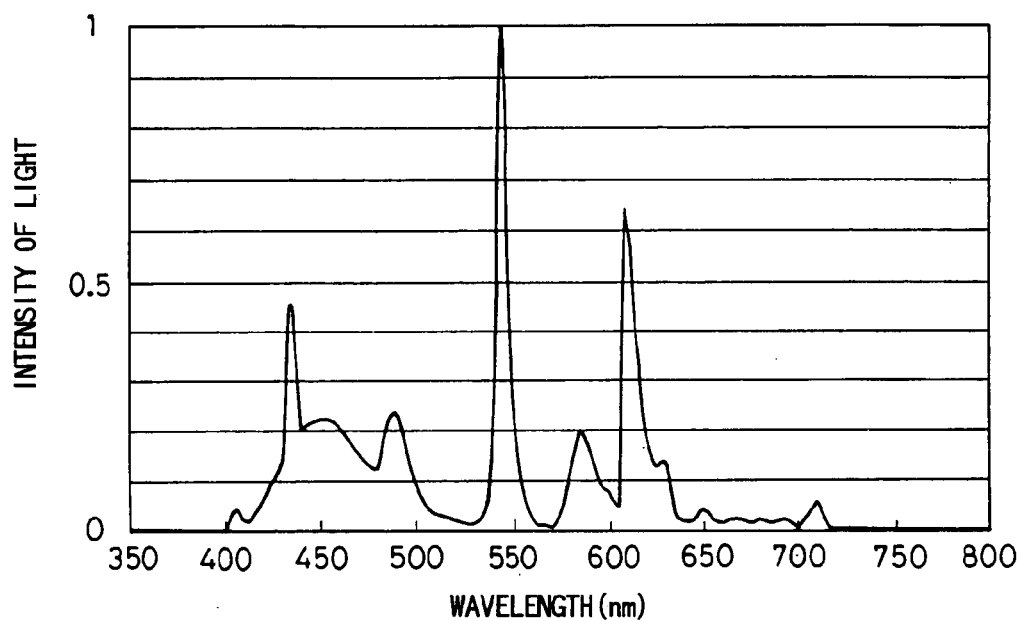
FIG. 11 is a graphic illustration of a spectrum of a light emitted from the first three-wavelength light source.

Furthermore, the inventors of this application carried out a simulation in the following manner: first, decide to use a three-wavelength light source (the first three-wavelength light source) as a backlight; secondly, vary the film thickness of color filter; thirdly, with respect to various film thicknesses of color filter, calculate the aperture ratio so as to take the value for allowing chromaticity coordinates of the transmissive display section to substantially match to the CIE (Center for International Education) chromaticity coordinates. In this case, a standard light CIE "C" was used as a light incident on the reflective display section. FIG. 11 is a graphic illustration of a spectrum of the light emitted from the first three-wavelength light source. Note that an intensity of light along the longitudinal axis shown in FIG. 11 is normalized such that the maximum intensity of light takes the value of one. The results obtained by carrying out the above-mentioned simulation will be illustrated in the following Tables 8 through 10.

TABLE 8

Film thickness 1.2 μm

| | Hue | Aperture ratio | x coordinate value | y coordinate value | NTSC ratio |
|---|---|---|---|---|---|
| Transmissive display section | Red | — | 0.447 | 0.291 | — |
| | Green | — | 0.335 | 0.387 | — |
| | Blue | — | 0.216 | 0.252 | — |
| | White | — | 0.329 | 0.317 | 0.084 |

TABLE 8-continued

Film thickness 1.2 μm

| | Hue | Aperture ratio | x coordinate value | y coordinate value | NTSC ratio |
|---|---|---|---|---|---|
| Reflective display section (having optimal slits) | Red | 0.15 | 0.448 | 0.321 | — |
| | Green | 0.40 | 0.317 | 0.387 | — |
| | Blue | 0.10 | 0.191 | 0.252 | — |
| | White | — | 0.313 | 0.331 | 0.082 |

TABLE 9

Film thickness 1.6 μm

| | Hue | Aperture ratio | x coordinate value | y coordinate value | NTSC ratio |
|---|---|---|---|---|---|
| Transmissive display section | Red | — | 0.476 | 0.292 | — |
| | Green | — | 0.333 | 0.407 | — |
| | Blue | — | 0.197 | 0.234 | — |
| | White | — | 0.330 | 0.320 | 0.128 |
| Reflective display section (having optimal slits) | Red | 0.12 | 0.476 | 0.324 | — |
| | Green | 0.31 | 0.314 | 0.409 | — |
| | Blue | 0.08 | 0.178 | 0.236 | — |
| | White | — | 0.314 | 0.337 | 0.124 |
| Reflective display section (having constant aperture ratio regardless of a color to be displayed) | Red | 0.15 | 0.461 | 0.326 | — |
| | Green | 0.15 | 0.311 | 0.440 | — |
| | Blue | 0.15 | 0.204 | 0.254 | — |
| | White | — | 0.315 | 0.347 | 0.127 |

TABLE 10

Film thickness 2.0 μm

| | Hue | Aperture ratio | x coordinate value | y coordinate value | NTSC ratio |
|---|---|---|---|---|---|
| Transmissive display section | Red | — | 0.507 | 0.296 | — |
| | Green | — | 0.332 | 0.426 | — |
| | Blue | — | 0.182 | 0.214 | — |
| | White | — | 0.331 | 0.324 | 0.179 |
| Reflective display section (having optimal slits) | Red | 0.08 | 0.514 | 0.328 | — |
| | Green | 0.26 | 0.311 | 0.425 | — |
| | Blue | 0.05 | 0.162 | 0.216 | — |
| | White | — | 0.315 | 0.342 | 0.18 |

As shown in the above-indicated Tables 8 through 10, in a case where slits are formed in the color filter to make the color filter have an appropriate aperture ratio, the chromaticity coordinates and NTSC ratio calculated with respect to the transmissive display section substantially match to those calculated with respect to the reflective display section even when the light source used in the simulation changes. On the other hand, in a case where slits are formed in the color filter to make the color filter have the same aperture ratio regardless of a color to be displayed, as shown in Table 9, difference in the color reproduction ranges of respective display sections is not large. However, as the saturations of color observed in a green color pixel increase whereas the saturations of color observed in a red color pixel and a blue color pixel decrease, difference in respective hues observed in the transmissive display section and the reflective display section results.

Figure 12:
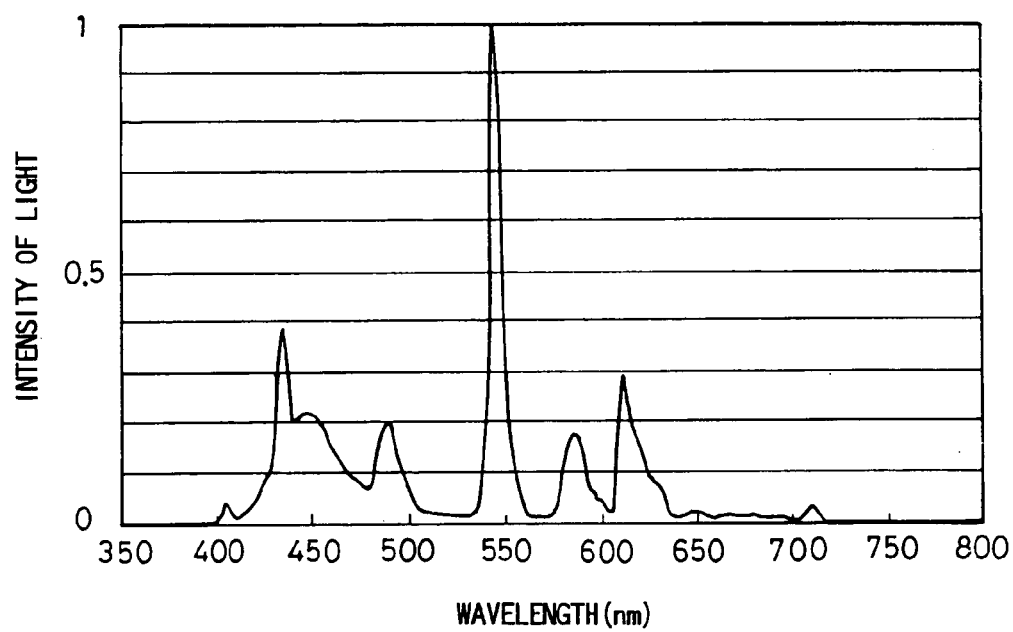
FIG. 12 is a graphic illustration of a spectrum of a light emitted from the second three-wavelength light source.

In the following description, relationship between an aperture ratio and a light source will be explained. When a spectrum of a light emitted from the light source varies, the chromaticity coordinates of a light exiting to the outside through a color filter within a transmissive display section vary correspondingly. This explanation will also be understood by comparing the figures of associated items indicated in the above-described Tables 1 through 7 with the figures of associated items indicated in the above-described Tables 8 through 10. To make the relationship between an optimal aperture ratio and a light source clearer, the inventors carried out a simulation. In the simulation, the film thickness of a color filter is fixed to be 1.6 μm and the aforementioned white-colored LED, the first three-wavelength light source and an additional three-wavelength light source (the second three-wavelength light source) are employed as a light source. FIG. 12 is a graphic illustration of a spectrum of a light emitted from the second three-wavelength light source. Note that an intensity of light along the longitudinal axis shown in FIG. 12 is normalized such that the maximum intensity of light takes the value of one. The results obtained by carrying out the above-mentioned simulation will be illustrated in the following Tables 11 through 13 in which the white-colored LED, the first three-wavelength light source and the second three-wavelength light source are employed, respectively.

TABLE 11

| | Hue | Aperture ratio | x coordinate value | y coordinate value | NTSC ratio |
|---|---|---|---|---|---|
| Transmissive display section | Red | — | 0.473 | 0.329 | — |
| | Green | — | 0.327 | 0.408 | — |
| | Blue | — | 0.185 | 0.252 | — |
| | White | — | 0.319 | 0.339 | 0.108 |
| Reflective display section (having optimal slits) | Red | 0.12 | 0.476 | 0.324 | — |
| | Green | 0.31 | 0.314 | 0.409 | — |
| | Blue | 0.14 | 0.200 | 0.251 | — |
| | White | — | 0.317 | 0.339 | 0.111 |

TABLE 12

| | Hue | Aperture ratio | x coordinate value | y coordinate value | NTSC ratio |
|---|---|---|---|---|---|
| Transmissive display section | Red | — | 0.476 | 0.292 | — |
| | Green | — | 0.333 | 0.407 | — |
| | Blue | — | 0.197 | 0.234 | — |
| | White | — | 0.330 | 0.320 | 0.128 |
| Reflective display section (having optimal slits) | Red | 0.12 | 0.476 | 0.324 | — |
| | Green | 0.31 | 0.314 | 0.409 | — |
| | Blue | 0.08 | 0.178 | 0.236 | — |
| | White | — | 0.314 | 0.337 | 0.124 |

TABLE 13

| | Hue | Aperture ratio | x coordinate value | y coordinate value | NTSC ratio |
|---|---|---|---|---|---|
| Transmissive display section | Red | — | 0.437 | 0.286 | — |
| | Green | — | 0.311 | 0.428 | — |
| | Blue | — | 0.195 | 0.243 | — |

TABLE 13-continued

| | Hue | Aperture ratio | x coordinate value | y coordinate value | NTSC ratio |
|---|---|---|---|---|---|
| | White | — | 0.303 | 0.331 | 0.126 |
| Reflective display section (having optimal slits) | Red | 0.20 | 0.440 | 0.327 | — |
| | Green | 0.20 | 0.312 | 0.429 | — |
| | Blue | 0.10 | 0.186 | 0.241 | — |
| | White | — | 0.311 | 0.343 | 0.116 |

As shown in Table 13, in the case where the second three-wavelength light source is employed in the simulation, an optimal color reproduction range is obtained when aperture ratios applied to a red color filter and a green color filter coincide with each other.

The results obtained by those simulations tell that regardless of a light source to be employed in the simulation, it is desirable to make the aperture ratio applied to the green color filter largest among three aperture ratios applied to the red, green and blue color filters. Specifically, in the case where a white-colored light source is employed in the simulation, it is preferable that the aperture ratio applied to the green color filter is made two to four times those applied to the red and blue color filters.

It should be noted that it is preferable that the slits of the color filter are formed to have a width of 1 µm to 10 µm. When the slits are formed to have a width narrower than 1 µm, operation for forming associated patterns in the color filter becomes difficult. On the other hand, when the slits are formed to have a width wider than 10 µm, operation for flattening an overcoat layer formed on the color filter becomes difficult.

Figure 13A:
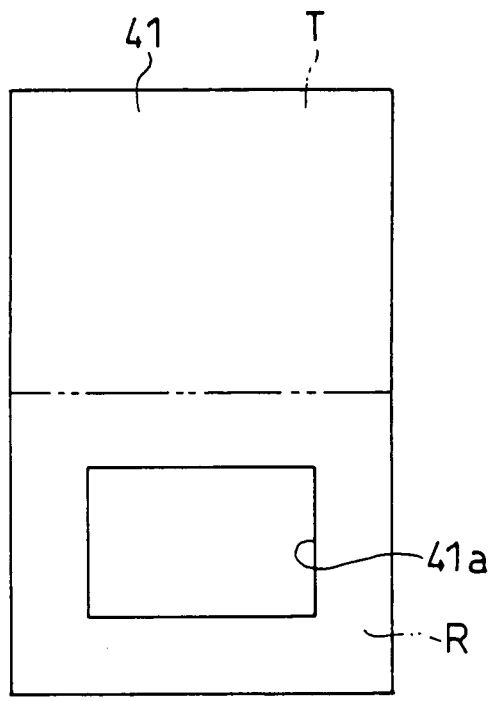
FIGS. 13A, 13B and 13C are plan views illustrating patterns of various color filters within associated pixels.
Figure 13B:
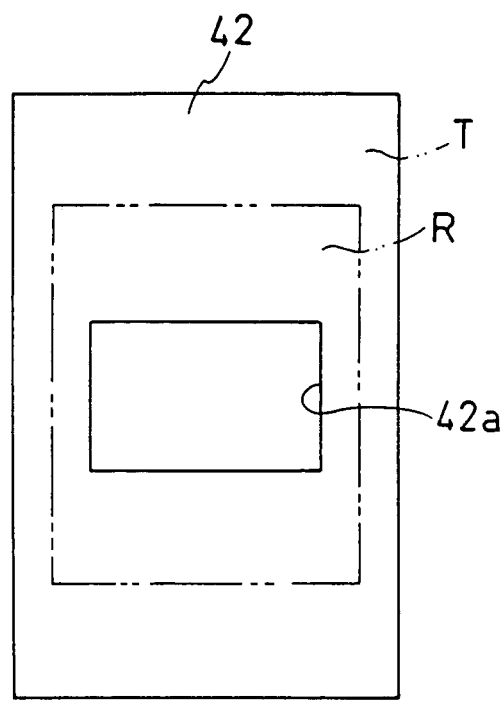
Figure 13C:
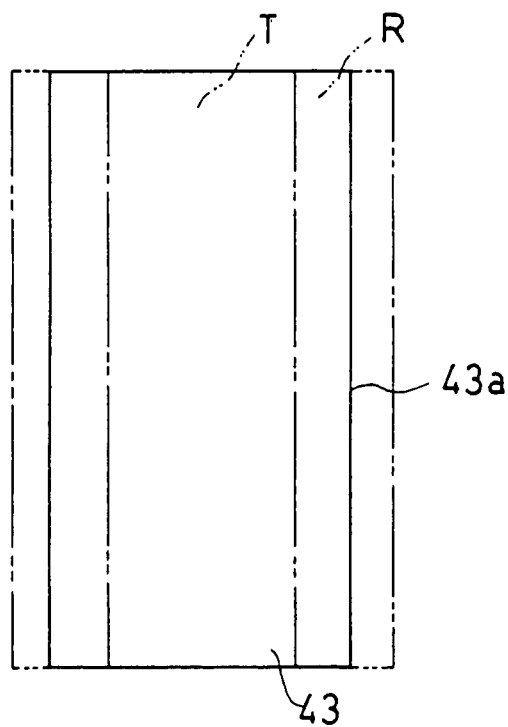

As already mentioned in the above-described explanation, the openings of the color filter is not limited to the above-described slits and therefore, may be constructed by employing another openings that have patterns different from those of the slits. Furthermore, a positional relationship relatively observed between the reflective display section and the transmissive display section is not limited to the above-described construction of reflective display and transmissive display sections. FIGS. 13A, 13B and 13C are plan views illustrating patterns of various color filters and positional relationship between reflective display and transmissive display sections within a pixel.

For instance, as shown in FIG. 13A, in the case where the reflective display section R and the transmissive display section T are partitioned in the same manner shown in the above-described embodiment, the liquid crystal panel of the present invention may employ an opening 41a that is formed in the color filter 41 so as to be positioned in the center of the reflective display section R.

In addition, as shown in FIG. 13B, also in a case where the reflective display section R and the transmissive display section T are partitioned such that the reflective display section R is surrounded by the transmissive display section T, the liquid crystal panel of the present invention may employ an opening 42a that is formed in a color filter 42 so as to be positioned in the center of the reflective display section R.

Moreover, as shown in FIG. 13C, in a case where the reflective display section R and the transmissive display section T are partitioned such that the transmissive display section T is interposed between the two reflective display sections R, the liquid crystal panel of the present invention may employ the following construction of pixel. That is, the pixel is constructed such that a color filter 43 is formed to have its end lines 43a positioned nearer the transmissive display section T than the outer end lines of the two reflective display sections R, thereby creating regions in the pixel in which the color filter 43 is not formed.

It should be noted that regardless of a pattern of color filter, it is preferable that the ratio of an area of openings with respect to that of the reflective display section is made equal to or less than 50%. In other words, it would be desirable to form the color filter so as to occupy at least 50% of an entire area of the reflective display section. The reason is as follows. That is, when the color filter is formed to occupy less than 50% of an entire area of the reflective display section, the ratio of lights that have no opportunities to transmit through the color filter during the time in which the lights travel the associated distance after they are inputted to the inside until they are outputted to the outside with respect to entire lights associated with the reflective display section increases, thereby making it difficult for the color reproduction range of the reflective display section to coincide with that of the transmissive display section.

Figure 15:
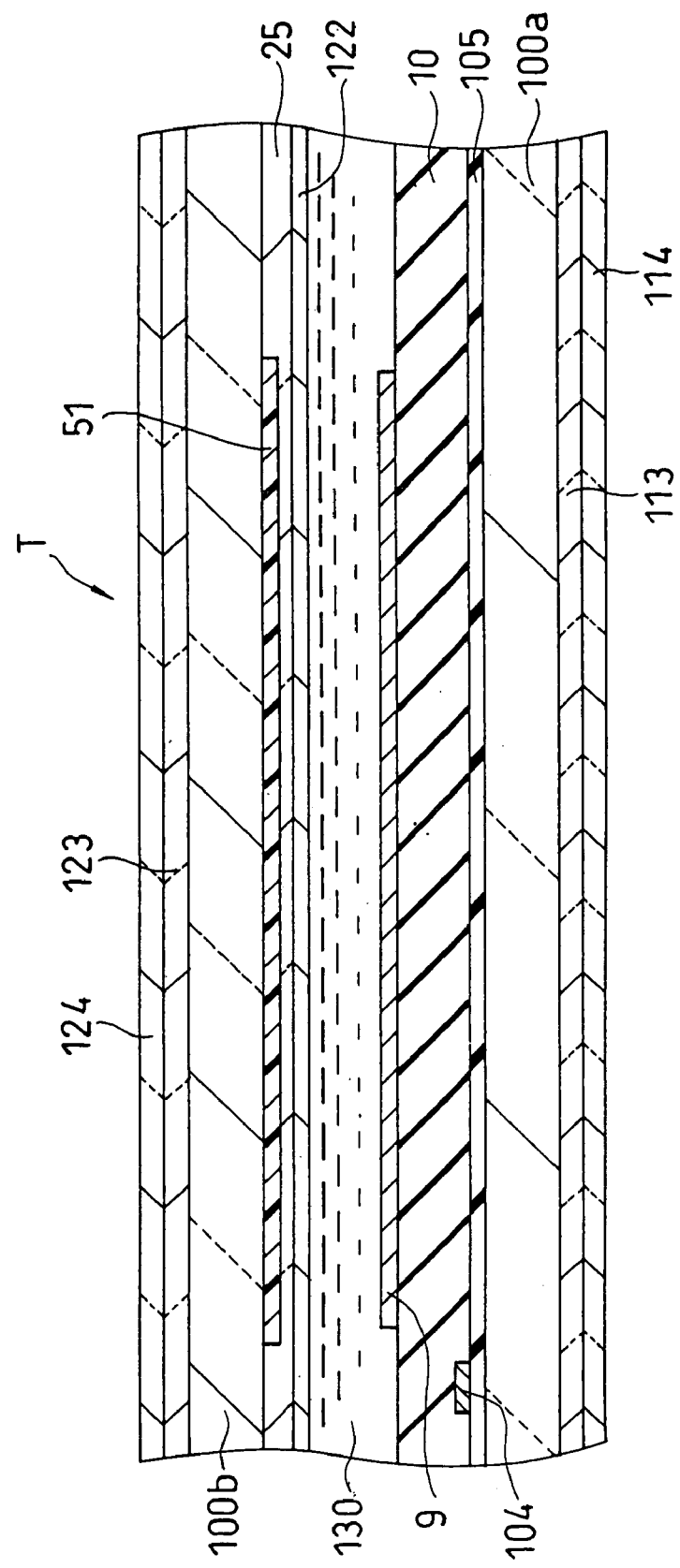
FIG. 15 is a cross sectional view, taken along the line B—B of FIG. 4, of a liquid crystal panel of the second embodiment constructed in accordance with the present invention.
Figure 16:
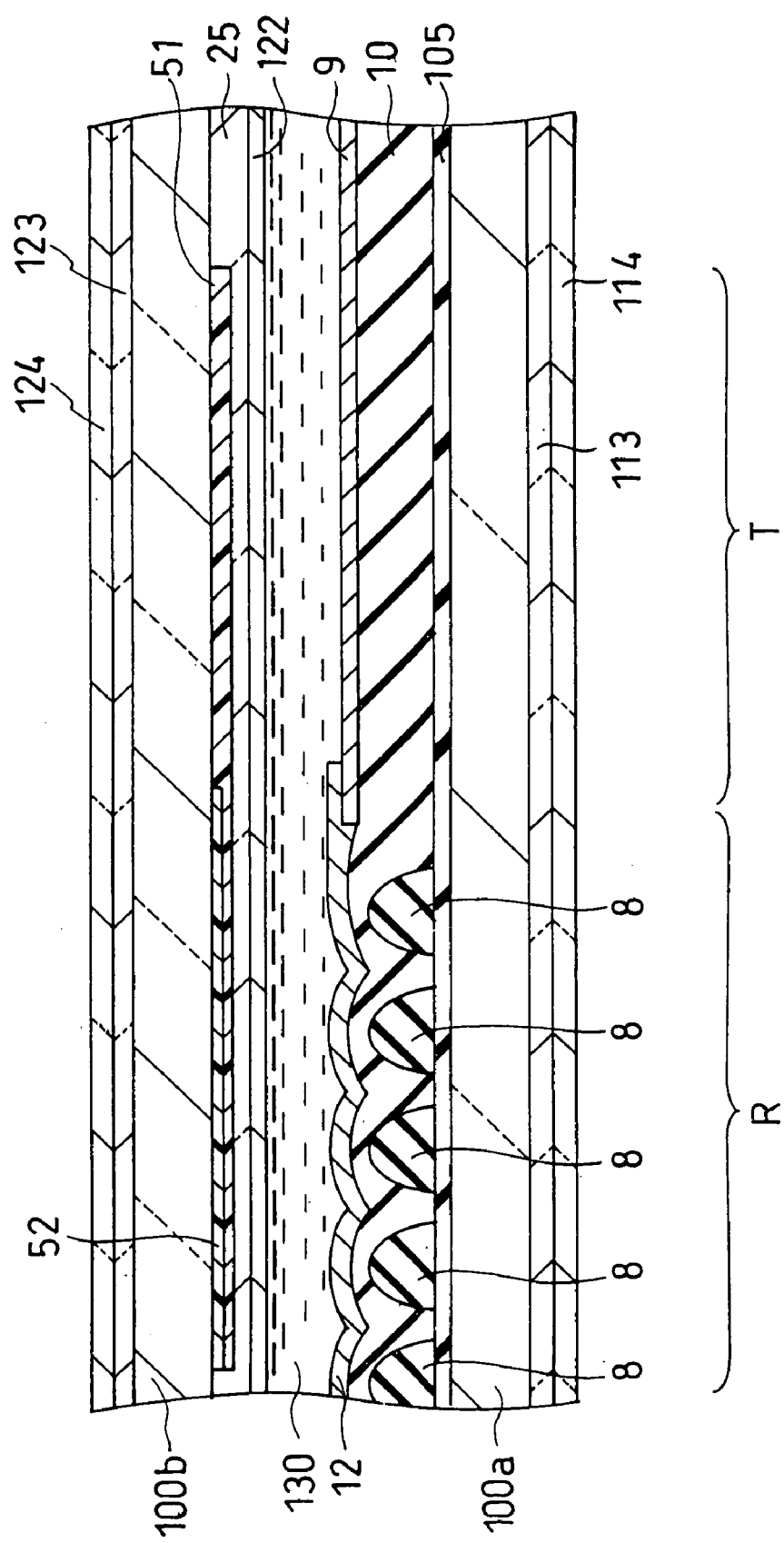
FIG. 16 is a cross sectional view, taken along the line C—C of FIG. 4, of a liquid crystal panel of the second embodiment constructed in accordance with the present invention.

The second embodiment of the present invention will be described below. In the second embodiment, the film thickness of color filter within a reflective display section is made thinner than that within a transmissive display section. FIGS. 14, 15 and 16 are cross sectional views, each illustrating a structure of a liquid crystal panel of the second embodiment constructed in accordance with the present invention, taken along the line A—A of FIG. 4, the line B—B of FIG. 4 and the line C—C of FIG. 4, respectively. Note that the parts and components used in the second embodiment shown in FIGS. 14, 15, 16 and also used in the first embodiment shown in FIGS. 4, 5, 6, 7, 8 are denoted by the same numerals as those referred in the first embodiment, thereby omitting detailed explanation thereof.

The second embodiment also includes the following construction of liquid crystal panel similar to that described in the first embodiment. That is, the liquid crystal panel of the second embodiment is constructed such that each pixel is partitioned into, for example, nearly two equal sections, i.e., a reflective display section R and a transmissive display section T, by a line extending in parallel with the scanning signal line. Furthermore, a TFT substrate is constructed in the same manner as that employed in the first embodiment.

A CF substrate of the second embodiment is constructed such that a color filter 51 is formed on a surface of a transparent substrate 100b on a side thereof facing a transparent substrate 100a. In addition, within the reflective display section R, a transparent resin layer 52 is formed between the color filter 51 and the transparent substrate 100b. In this case, the ratio of a volume of the transparent resin layer 52 with respect to an entire volume of the color filter 51 and the transparent resin layer 52 within the reflective display section R (hereinafter, the ratio is referred to as "volume ratio") is set at a value of, for example, 35% to 65%. The volume ratio can be adjusted by varying a film thickness or an area of the transparent resin layer 52. Note that the volume ratio varies depending on a color to be displayed and in the embodiment, the volume ratio applied to a green color pixel 101G is made, for example, about three times the volume ratio applied to a red color pixel 101R and a blue color pixel 101B. Furthermore, although the embodiment is constructed such that the transparent resin layer 52 is formed completely overlapping the color filter 51, the embodiment is not limited to the above-described construction of transparent resin layer and color filter. Additionally, it would be desirable that the color filter 51 has a flat surface in the same plane over two areas thereof corresponding to the reflective display section R and the transmissive display section T.

In the liquid crystal panel of the second embodiment constructed as described above, within the transmissive display section T, a light emitted from a backlight (not shown) exits to the outside through the color filter 51. Within the reflective display section R, a light reaching the reflective electrode 12 through the color filter 51 exits to the outside through the color filter 51. In this case, as the film thickness of the color filter 51 within the reflective display section R is being made approximately half that of the color filter 51 within the transmissive display section T, the substantial film thickness of color filter through which lights transmit during the time in which the lights travel the associated distance after they are inputted to the inside until they are outputted to the outside becomes nearly equal to that could be observed within the transmissive display section T. Furthermore, in the embodiment, as the volume ratio calculated with respect to the volume of the transparent resin layer 52 is made to vary depending on a color to be displayed, it becomes possible for the color reproduction range of the reflective display section R to coincide with that of the transmissive display section T, thereby allowing the liquid crystal panel to display high quality images.

Subsequently, the relationship between a volume ratio and a color balance will be explained below. The inventors of this application carried out the simulation similar to that performed in the first embodiment to make the above-described relationship clearer: first, decide to use a white-colored LED as a backlight; secondly, vary the film thickness of color filter and at the same time, vary the area of transparent resin layer; thirdly, with respect to various film thicknesses of color filter, calculate the volume ratio so as to take the value for allowing chromaticity coordinates of the transmissive display section to substantially match to the CIE (Center for International Education) chromaticity coordinates. In this case, a standard light CIE "C" is used as a light incident on the reflective display section. The results obtained through the above-described simulation will be indicated in the following Tables 14 and 15.

TABLE 14

| | | Film thickness 2.2 μm | | | | |
|---|---|---|---|---|---|---|
| | Hue | Area ratio | Volume ratio | x coordinate value | y coordinate value | NTSC ratio |
| Transmissive display section | Red | — | — | 0.518 | 0.333 | |
| | Green | — | — | 0.325 | 0.43 | |
| | Blue | — | — | 0.161 | 0.227 | |
| | White | — | — | 0.319 | 0.342 | 0.175 |
| Reflective display section (having optimal transparent resin layer) | Red | 0.82 | 0.58 | 0.51 | 0.309 | |
| | Green | 0.98 | 0.41 | 0.314 | 0.427 | |
| | Blue | 0.70 | 0.48 | 0.158 | 0.23 | |
| | White | — | — | 0.313 | 0.34 | 0.18 |

TABLE 15

| | | Film thickness 2.0 μm | | | | |
|---|---|---|---|---|---|---|
| | Hue | Area ratio | Volume ratio | x coordinate value | y coordinate value | NTSC ratio |
| Transmissive display section | Red | — | — | 0.506 | 0.331 | |
| | Green | — | — | 0.325 | 0.423 | |
| | Blue | — | — | 0.167 | 0.234 | |
| | White | — | — | 0.319 | 0.341 | 0.154 |
| Reflective display section (having optimal transparent resin layer) | Red | 0.80 | 0.60 | 0.501 | 0.308 | |
| | Green | 1.00 | 0.42 | 0.316 | 0.417 | |
| | Blue | 0.70 | 0.48 | 0.163 | 0.235 | |
| | White | — | — | 0.313 | 0.337 | 0.158 |

It should be noted that "area ratio" indicated in the tables represents the ratio of an area of transparent resin layer with respect to an area of color filter within the reflective display section and "volume ratio" represents the ratio of a volume of transparent resin layer with respect to an entire volume of color filter and transparent resin layer within the reflective display section. In addition, "film thickness" represents a film thickness of color filter within the transmissive display section, coinciding with an entire film thickness of color filter and transparent resin layer within the reflective display section.

As indicated in the above-described Tables 14 and 15, in a case where a transparent resin layer is formed within the reflective display section to have an appropriate volume ratio, the chromaticity coordinates and NTSC ratio calculated with respect to the transmissive display section substantially match to those calculated with respect to the reflective display section.

A method for manufacturing the liquid crystal panel of the first embodiment will be explained below. A TFT substrate can be manufactured by using the same method as that employed to manufacture the conventional liquid crystal panel. On the other hand, a CF substrate can be manufactured using, for instance, the following method: first, coat a photosensitive resin film as a raw material film that constitutes a monochrome color filter on a transparent substrate 100b; secondly, expose the photosensitive resin film using a photomask that has a predetermined slit pattern therein and then, develop the photosensitive resin film. Through those steps, the photosensitive resin film is patterned to constitute a monochrome color filter 21 having slits 21a therein. Those steps are carried out to form three color filters 21 respectively. Note that the ratio of an area of a pattern to be formed in the photomask corresponding to the slits with respect to an area of the photomask, for example, is made maximum when using a photomask to form a green color filter. That is, the ratios applied to the associated color filters are individually adjusted. In other words, the photomasks are individually formed to have a pattern associated with a slit pattern formed in the color filter and corresponding to a color to be displayed. In a case where a white-colored light source is employed in the liquid crystal display device, it is preferable that the ratio of an area of slit pattern with respect to an area of the photomask used to form a green color filter is made about two to four times that should be applied to a photomask to form a red or blue color filter.

After formation of three color filters, an overcoat layer is formed on an entire surface of the transparent substrate 100b while achieving flatness thereof and further, an opposing electrode is formed thereon. Furthermore, a retardation film and a polarizer are formed on a surface of the transparent substrate 100b on a side thereof defined as the surface on which the color filter is not formed.

A method for manufacturing the liquid crystal panel of the second embodiment will be explained below. A TFT substrate can be manufactured by using the same method as that employed to manufacture the conventional liquid crystal panel. On the other hand, a CF substrate can be manufactured using, for instance, the following method: first, previously prepare photomasks in such a manner that the photomasks each are formed corresponding to a color to be displayed to have a pattern therein corresponding to a pattern of transparent resin film; secondly, coat a raw material film that constitutes a transparent resin film on a transparent substrate 100b; thirdly, form an associated pattern in the raw material film using the above-described photomask followed by formation of a transparent resin film 52 on the transparent substrate 100b; fourthly, coat another raw material film that constitutes a color filter on the transparent substrate 100b and then, carry out associated process steps of, for instance, exposing and developing the another raw material film to form the color filter so as to have a flat surface thereof corresponding to a color to be displayed. Note that the ratio of an area of a pattern formed in the photomask and corresponding to a pattern of transparent resin film with respect to an area of photomask, for example, is made maximum when using the photomask to form a green color filter. That is, the ratios applied to the associated color filters are individually adjusted. In other words, the photomasks are individually formed to have a pattern corresponding to a pattern of transparent resin film and a color to be displayed. In a case where a white-colored light source is employed in the liquid crystal display device, it is preferable that the ratio of an area of a pattern formed in the photomask with respect to an area of photomask, which is applied to a photomask used to form a green color filter, is made about two to four times that should be applied to a photomask to form a red or blue color filter.

After formation of three color filters, an overcoat layer is formed on an entire surface of the transparent substrate 100b while achieving flatness thereof and further, an opposing electrode is formed thereon. Furthermore, a retardation film and a polarizer are formed on the transparent substrate 100b on a backside thereof defined as the surface on which the color filter is not formed.

It should be noted that although the liquid crystal panel employed in the first and second embodiments does not have a black matrix between the adjacent color filters of the CF substrate, the liquid crystal panel may be constructed such that the black matrix is formed between the adjacent color filters of the CF substrate. Furthermore, although the liquid crystal panel employed in the first and second embodiments have a color filter formed on a transparent substrate on which a thin film transistor is not formed, the liquid crystal panel may be constructed such that the color filter is formed on a substrate on which a thin film transistor is formed. In this case, the color filter is formed on, for example, a reflective electrode or a transparent electrode.

Figure 17A:
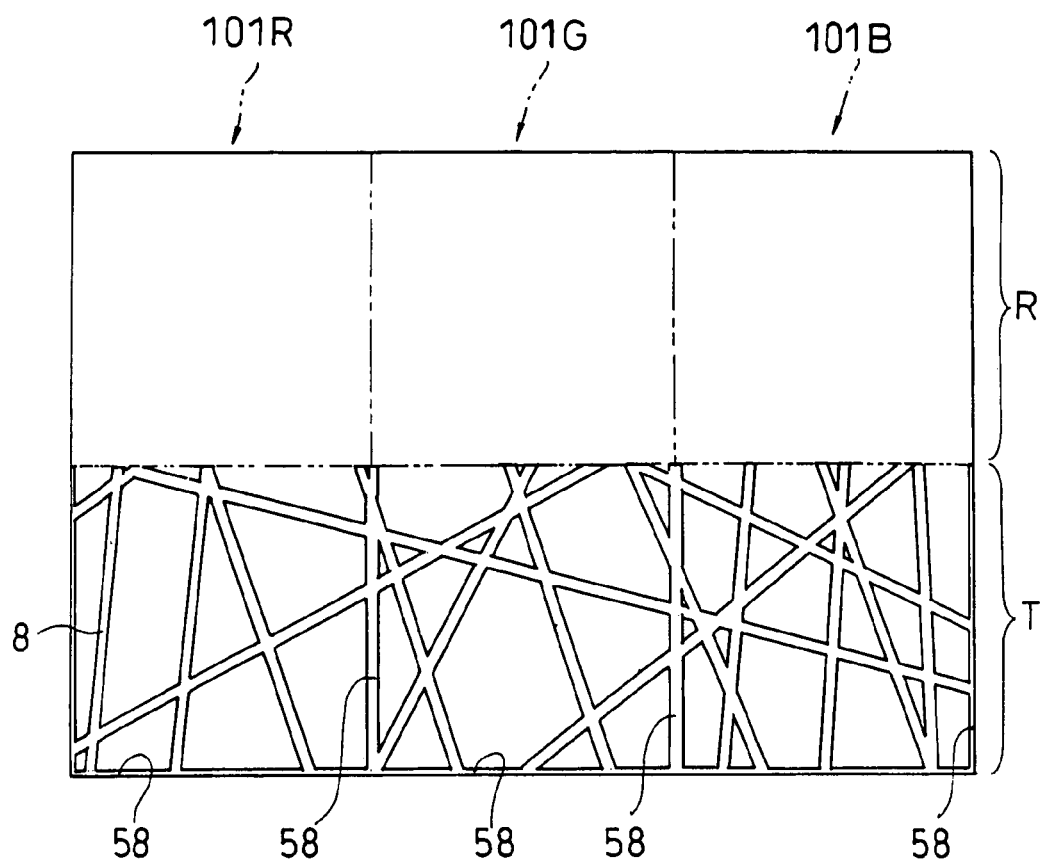
FIG. 17A is a layout diagram indicating projecting portions formed under a reflective electrode in the liquid crystal panel of the third embodiment of the present invention and FIG. 17B is a schematic cross sectional view of the liquid crystal panel.
Figure 17B:
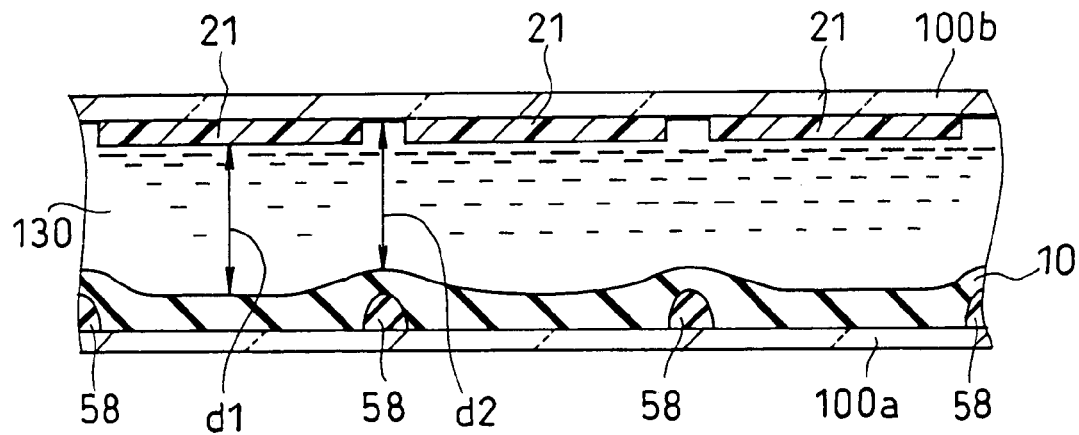

The third embodiment of the present invention will be described below. An object of the third embodiment is to provide a liquid crystal display device in which an improvement in the chromaticness of color is performed. FIG. 17A is a layout diagram indicating projecting portions formed under a reflective electrode in the liquid crystal panel of the third embodiment of the present invention and FIG. 17B is a schematic cross sectional view of the liquid crystal panel.

In the first and second embodiments, the projecting portions 8 are formed under the reflective electrode in all directions to make the reflective electrode have a convex-concave surface that reflects the profile of the projecting portions. In the embodiment, in addition to the projecting portions 8, projecting portions 58 formed in the same step through which the projecting portions 8 are formed are formed in boundary regions between pixels that are located adjacent to each other in a direction in which a scanning signal line (gate line) extends. The width and height of the projecting portion 58 are substantially the same as those of the projecting portion 8.

According to the third embodiment constructed as described above, as shown in FIG. 17B, difference between a gap "d1" between a color filter 21 and an insulation film 10 under the reflective electrode within a pixel and a gap "d2" between a transparent substrate 100b and the insulation film 10 in the boundary regions between pixels is made to become shorter than that observed in the conventional liquid crystal panel. In more detail, as undesirable boundary regions in which the projecting portions 108 are not formed exist in boundary regions between pixels in the conventional liquid crystal panel, a gap between the undesirable boundary regions and the transparent substrate 100b becomes extremely long in comparison with the gap observed in the embodiment in which such undesirable boundary regions never exist. According to the liquid crystal panel of the embodiment, images appearing pale yellow in color are substantially eliminated from a display thereof.

It should be noted that assuming a width of the projecting portion 58 is designed to be W1 and a width of the projecting portion 8 is designed to be W2, it is preferable that the projecting portions 58 and 8 are formed satisfying the following equation:

$$(W2-1) \leq W1 \leq (W2+1) \text{ (unit: μm)}$$

Furthermore, it is more preferable that the projecting portions 58, 8 are formed satisfying the following equation:

$$(W2-0.5) \leq W1 \leq (W2+0.5) \text{ (unit: μm)}$$

Figure 18:
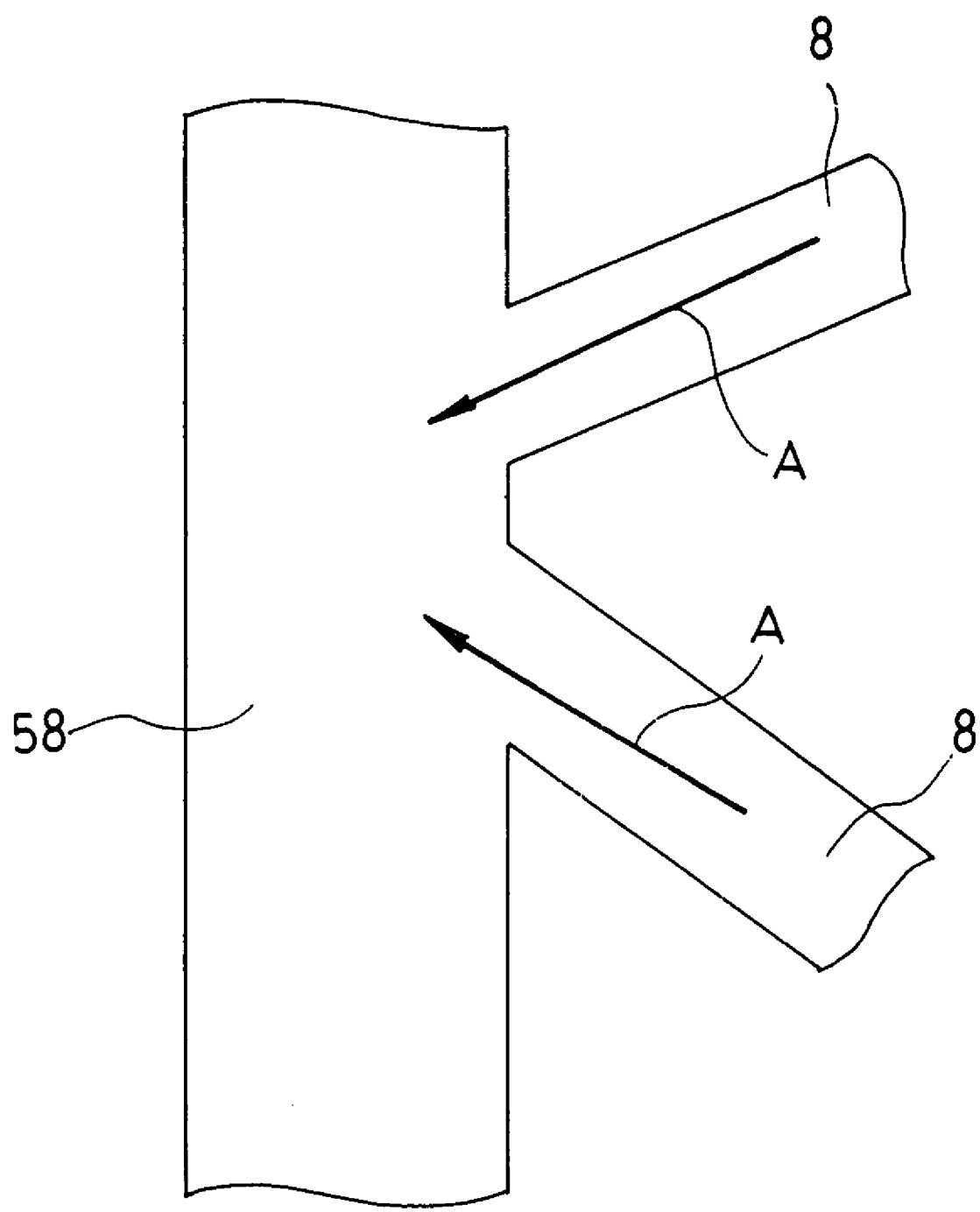
FIG. 18 is a schematic diagram to explain the relationship between a width of projecting portion and a height thereof that varies depending on the width.

FIG. 18 is a schematic diagram to explain the relationship between a width of projecting portion and a height thereof that varies depending on the width. In a case where "W2" is made longer than "W1", when the projecting portions are subjected to heat treatment (liquefaction of a material through baking) in an associated manufacturing step, difference between surface tensions of the projecting portions 8 and 58 makes the material constituting the projecting portion 8 flow, as indicated by the arrow "A," into the projecting portion 58. As a result, the height of the projecting portion 58 becomes longer than the designed value whereas the height of the projecting portion 8 becomes shorter than the designed value. On the contrary, in a case where "W2" is made shorter than "W1", the height of the projecting portion 58 becomes shorter than the designed value whereas the height of the projecting portion 8 becomes longer than the designed value, thereby making it impossible to eliminate the difference between the gaps "d1" and "d2." Accordingly, it is desirable to design the values of "W1" and "W2" to become substantially equal to each other while securing the above-described margin in the equations. Note that if the cross sectional view shown in FIG. 17B is accurately drawn so as to correspond to FIG. 17A, the projecting portion 8 should also be drawn in FIG. 17B. However, for simplicity, in the cross sectional view shown in FIG. 17B, the projecting portions 8 are omitted whereas the projecting portions 58 are drawn. Furthermore, it should be understood by those skilled in the art that the liquid crystal panel shown in FIG. 14 and FIG. 16 is also constructed as described above, that is, constructed such that the projecting portions 58 having the same width and height as those of the projecting portions 8 are being formed in addition to the projecting portions 8.

A method for manufacturing projecting portions under a reflective electrode using a single photosensitive resin film will be explained below. First, a method for manufacturing the projecting portions through two exposure steps will be explained and then, a method for manufacturing the same through one exposure step will be explained. FIGS. 19A, 19B, 20A, 20B and 21 are schematic diagrams showing the method for manufacturing the projecting portions through two exposure steps in order.

Figure 19A:
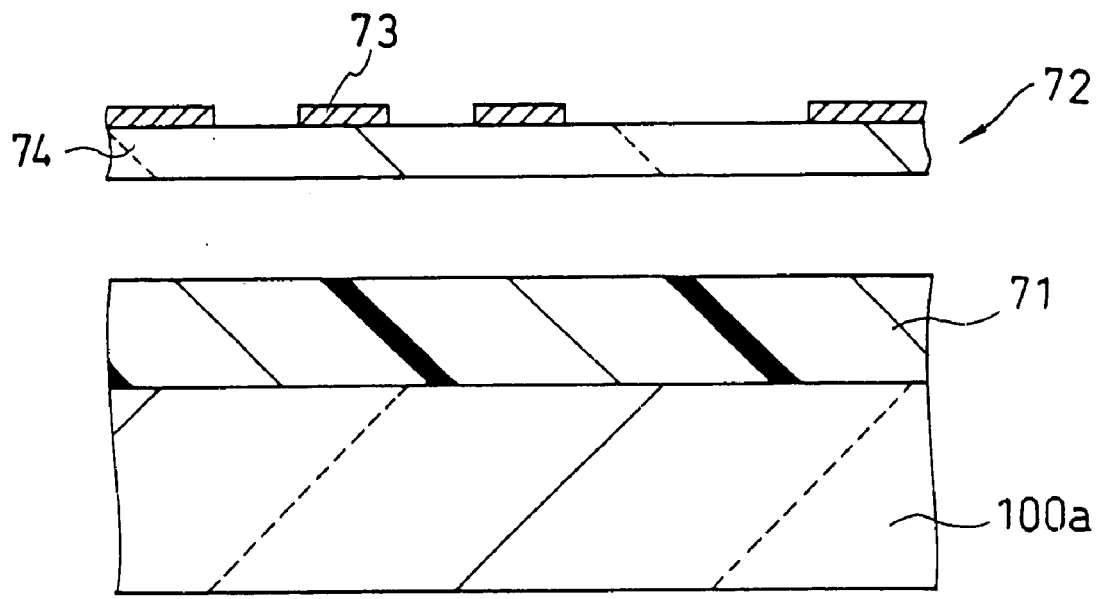
FIGS. 19A and 19B are schematic diagrams showing the method for manufacturing the projecting portions through two exposure steps.

First, as shown in FIG. 19A, after formation of a TFT (not shown) and the like, coat a resist film 71 consisting of a photosensitive resin on a transparent substrate 100a. Until the above-described coating is completed, prepare a photomask 72 in such a manner that a Cr film 73 that prevent a light from being incident on the resist film 71 on a part thereof corresponding to the projecting portions is formed on a transparent substrate 74.

Figure 19B:
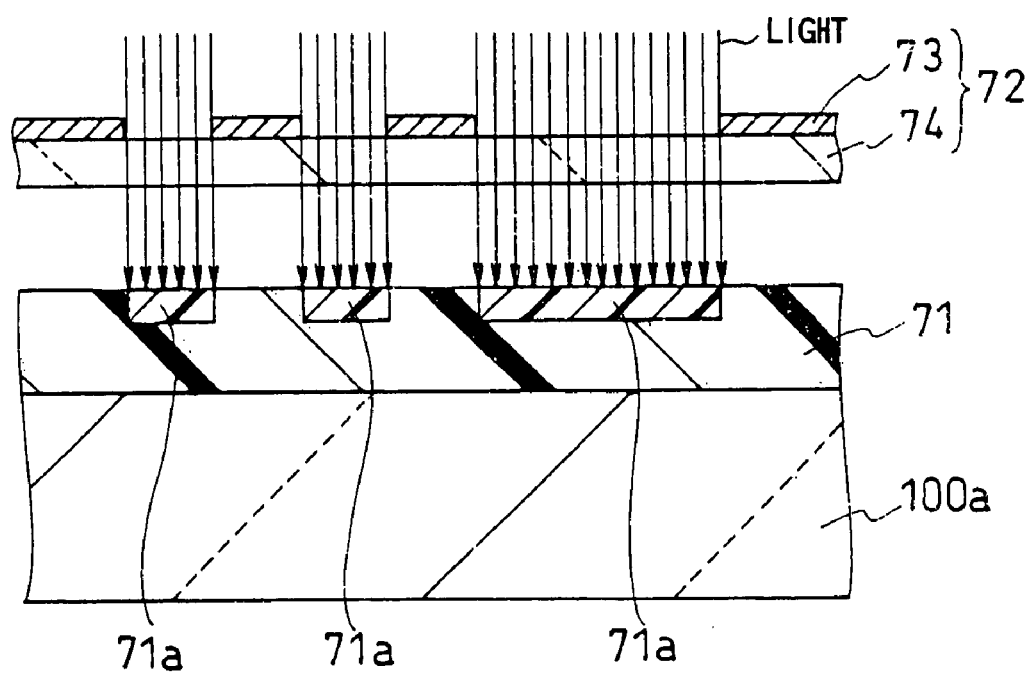

Subsequently, as shown in FIG. 19B, expose the resist film 71 consisting of a photosensitive resin using the photomask 72 to form exposed portions 71a in the resist film 71. In this case, the depth of exposure is preferably limited to the position located, for example, about half the film thickness of the resist film 71 consisting of a photosensitive resin down from the surface of the resist film.

Figure 20A:
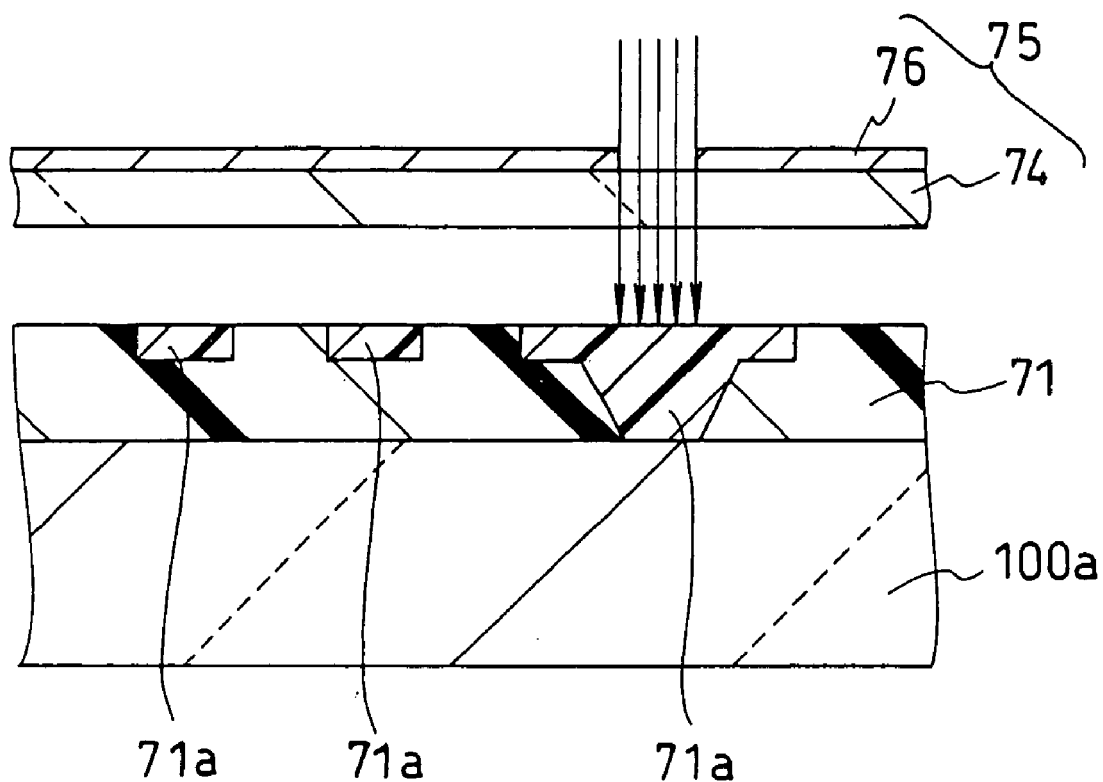
FIGS. 20A and 20B are schematic diagrams showing the method for manufacturing the projecting portions through two exposure steps and illustrate process steps subsequent to the steps of FIGS. 19A and 19B in order.

Thereafter, as shown in FIG. 20A, prepare a photomask 75 in such a manner that a Cr film 76 having an opening only in a part thereof corresponding to a contact hole 11 is formed on a transparent substrate 74. Then, expose the resist film 71 consisting of a photosensitive resin using the photomask 75 to form another exposed portion 71a in the resist film 71, which corresponds to the portion of the resist film where the contact hole 11 will be formed later on, so as to reach the surface of a source electrode (not shown).

Figure 20B:
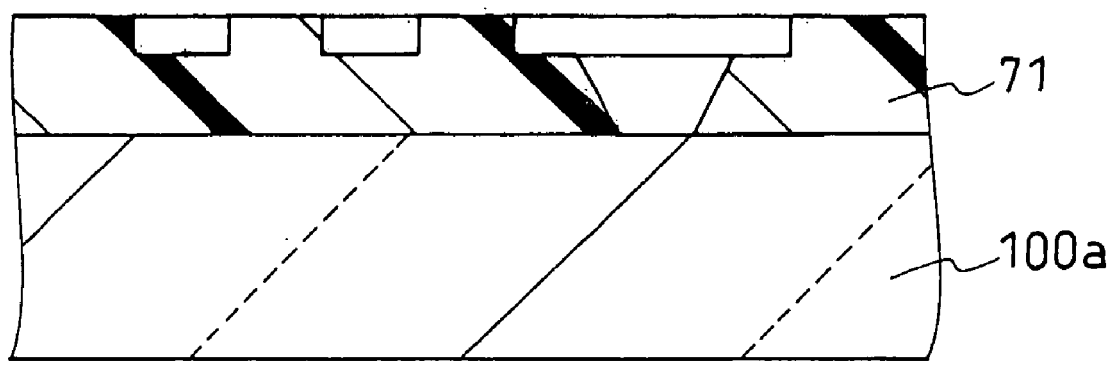

After that, as shown in FIG. 20B, develop the resist film to remove the exposed portions 71a.

Figure 21:
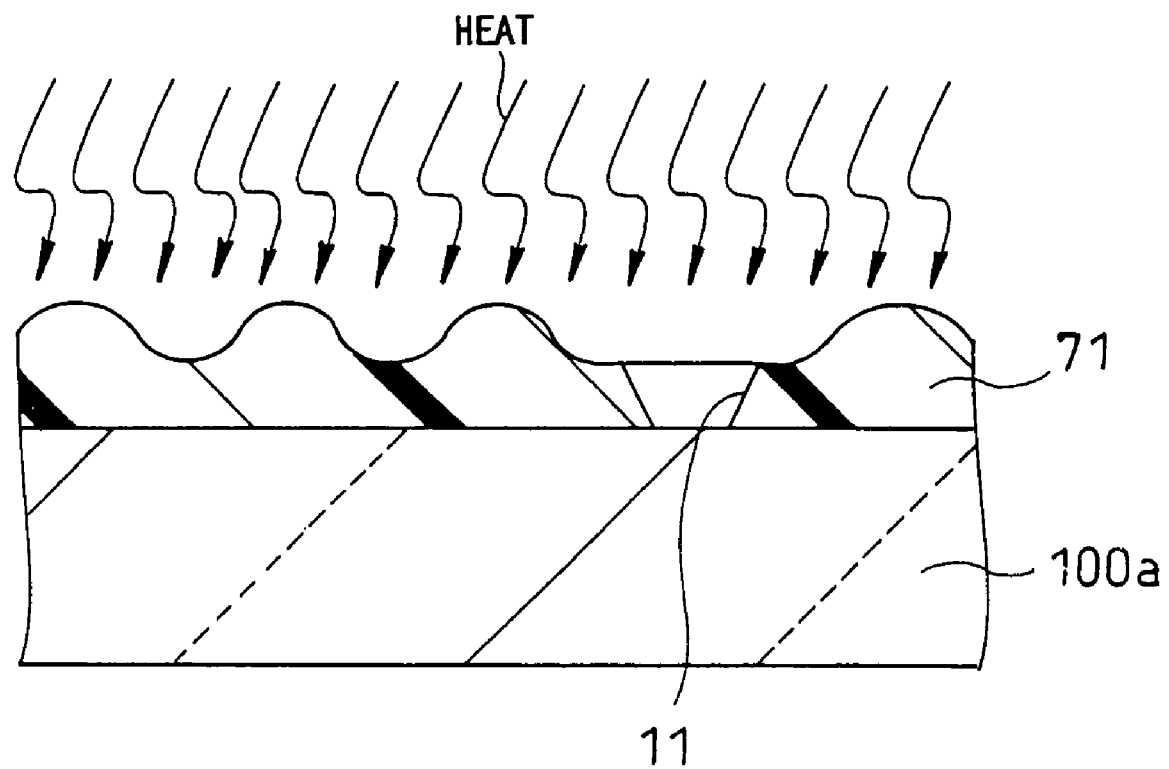
FIG. 21 is a schematic diagram showing the method for manufacturing the projecting portions through two exposure steps and illustrates a process step subsequent to the steps of FIGS. 20A and 20B.

Subsequently, as shown in FIG. 21, bake the resist film 71 consisting of a photosensitive resin to flow to round the steps existing at the surface of the resist film 71 consisting of a photosensitive resin. As a result, the projecting portions and the contact hole 11 are formed.

A method for manufacturing the projecting portions through one exposure step will be explained below. FIGS. 22A, 22B, 23A and 23B are schematic diagrams showing the method for manufacturing the projecting portions through one exposure step in order.

Figure 22A:
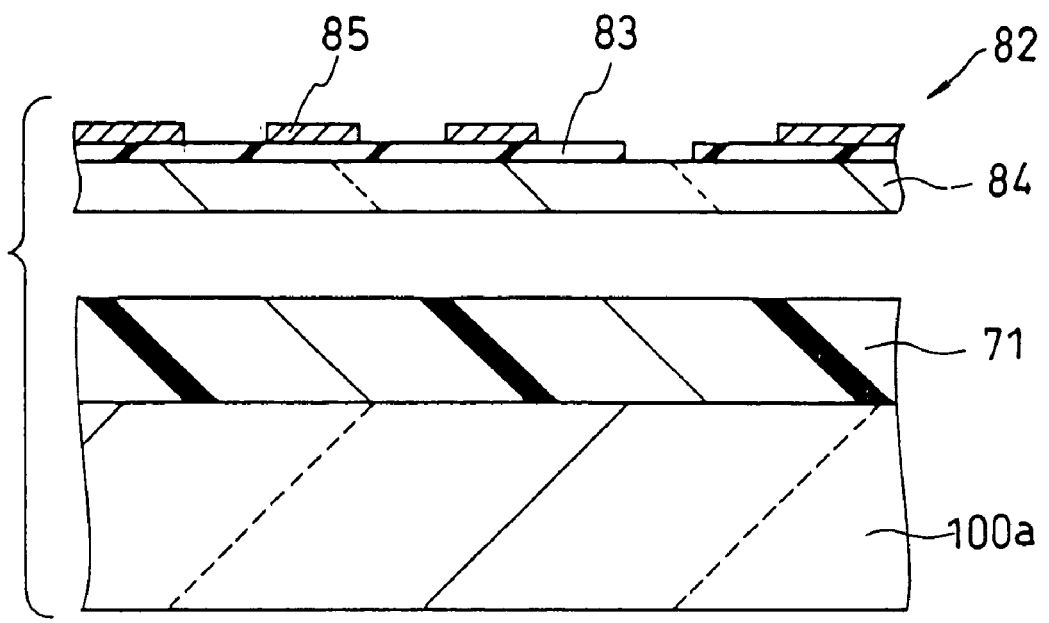
FIGS. 22A and 22B are schematic diagrams showing the method for manufacturing the projecting portions through one exposure step.

First, as shown in FIG. 22A, after formation of a TFT (not shown), coat a resist film 71 consisting of a photosensitive resin on a transparent substrate 100a. Until the above-described coating is completed, prepare a photomask 82 in the following manner. That is, a semi-transparent film 83 having an opening only in a part thereof corresponding to a contact hole 11 is formed on a transparent substrate 84 and further, a Cr film 85 that prevents a light from being incident on the resist film 71 on a part thereof corresponding to the projecting portions is formed on the semi-transparent film. In this case, the semi-transparent film 83 consists of, for instance, a metal oxide film.

Figure 22B:
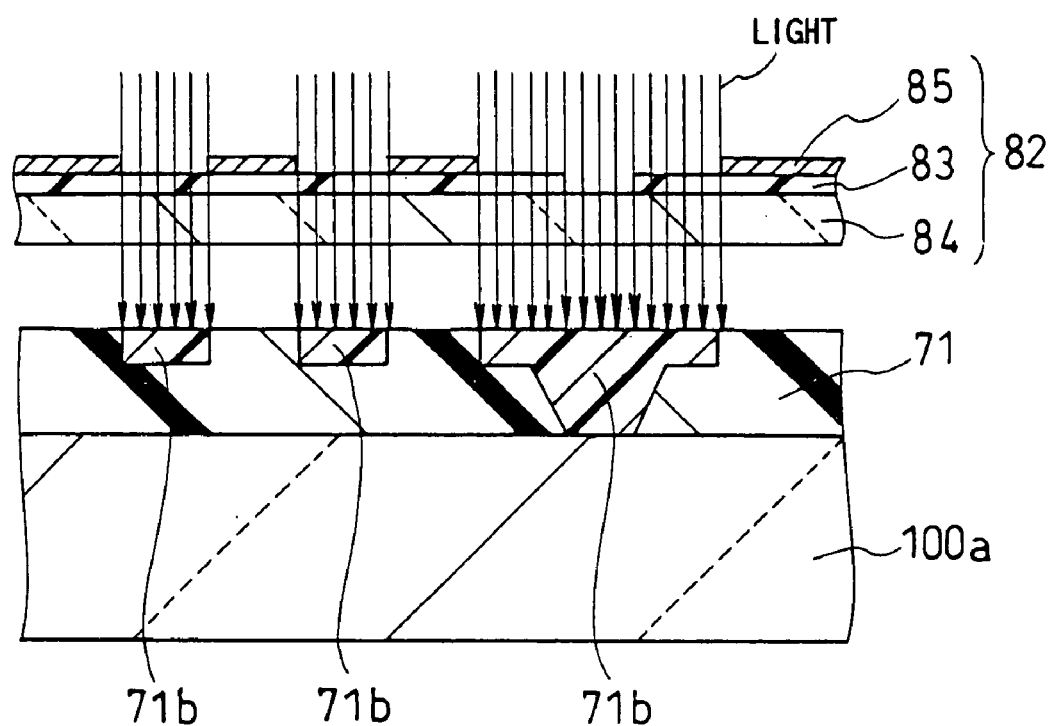

Subsequently, as shown in FIG. 22B, expose the resist film 71 consisting of a photosensitive resin using the photomask 82 to form exposed portions 71b. In this case, the depth of exposure through the semi-transparent film 83 is preferably limited to the position located, for example, about half the film thickness of the resist film 71 consisting of a photosensitive resin down from the surface of the resist film. As a result, the exposed portion 71b is formed in the resist film 71 consisting of a photosensitive resin. A portion, corresponding to the contact hole 11, out of the exposed portion 71b, directly receives an exposure light that does not transmit through the semi-transparent film 83 and therefore, the depth of exposure is positioned in proximity to the surface of a source electrode (not shown).

Figure 23A:
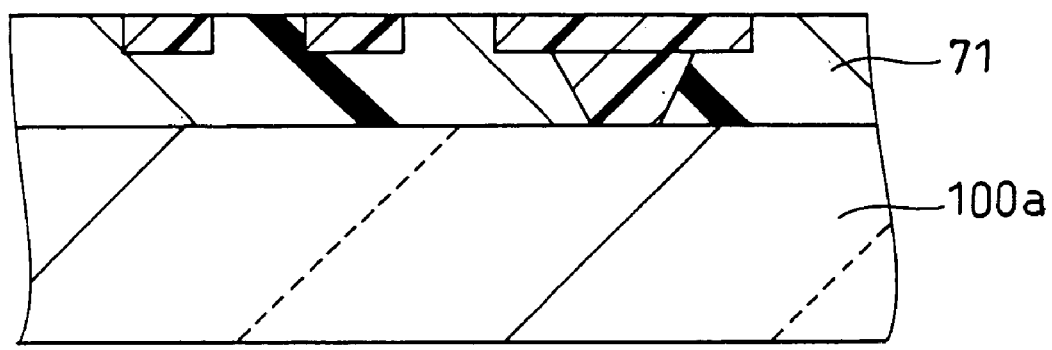
FIGS. 23A and 23B are schematic diagrams showing the method for manufacturing the projecting portions through one exposure step and illustrate process steps subsequent to the steps of FIGS. 22A and 22B in order.

Thereafter, as shown in FIG. 23A, develop the resist film to remove the exposed portions 71b.

Figure 23B:
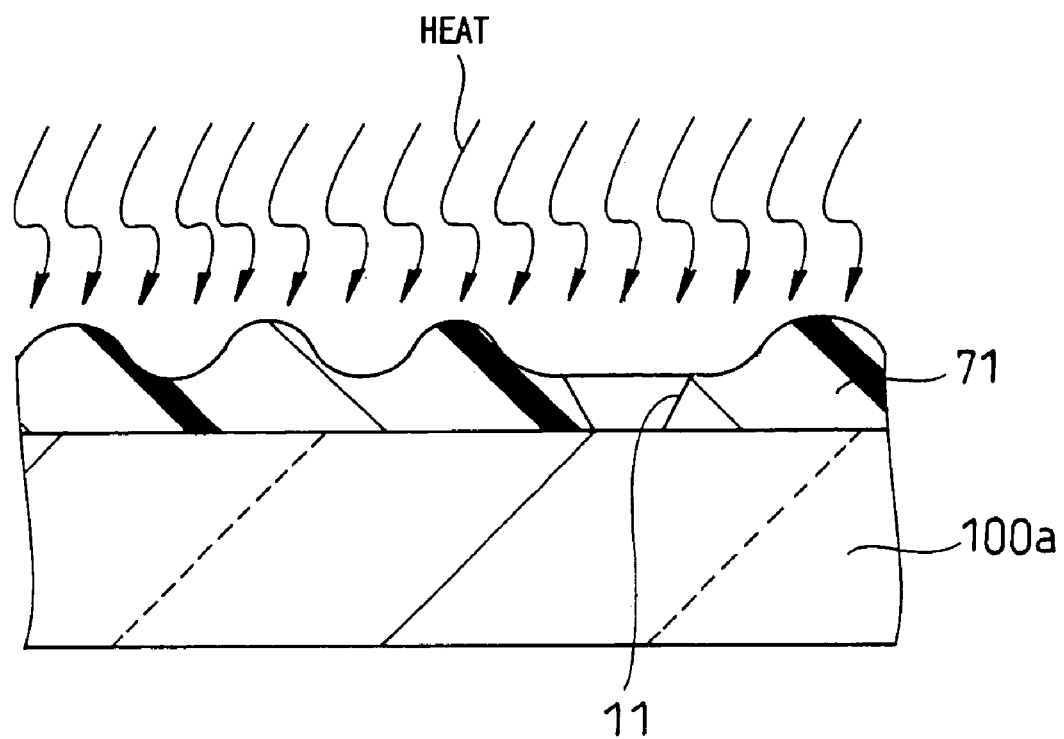

Subsequently, as shown in FIG. 23B, bake the resist film 71 consisting of a photosensitive resin to flow to round the steps existing at the surface of the resist film 71 consisting of a photosensitive resin. As a result, the projecting portions and the contact hole 11 are formed.

It should be noted that although the embodiment employs a resist film consisting of a photosensitive resin to form projecting portions, instead of it, the embodiment may employ the following method for manufacturing projecting portions. That is, for example, form a plurality of projecting portions consisting of an insulation film and further, form another insulation film thereon covering an entire surface of the insulation film, thereby forming a convex-concave surface within pixels and in a boundary between pixels.

Furthermore, the liquid crystal panel of the present invention may be constructed by combining one of the constructions of liquid crystal panel employed in the first and second embodiments with the construction of liquid crystal panel employed in the third embodiment.

Figure 24:
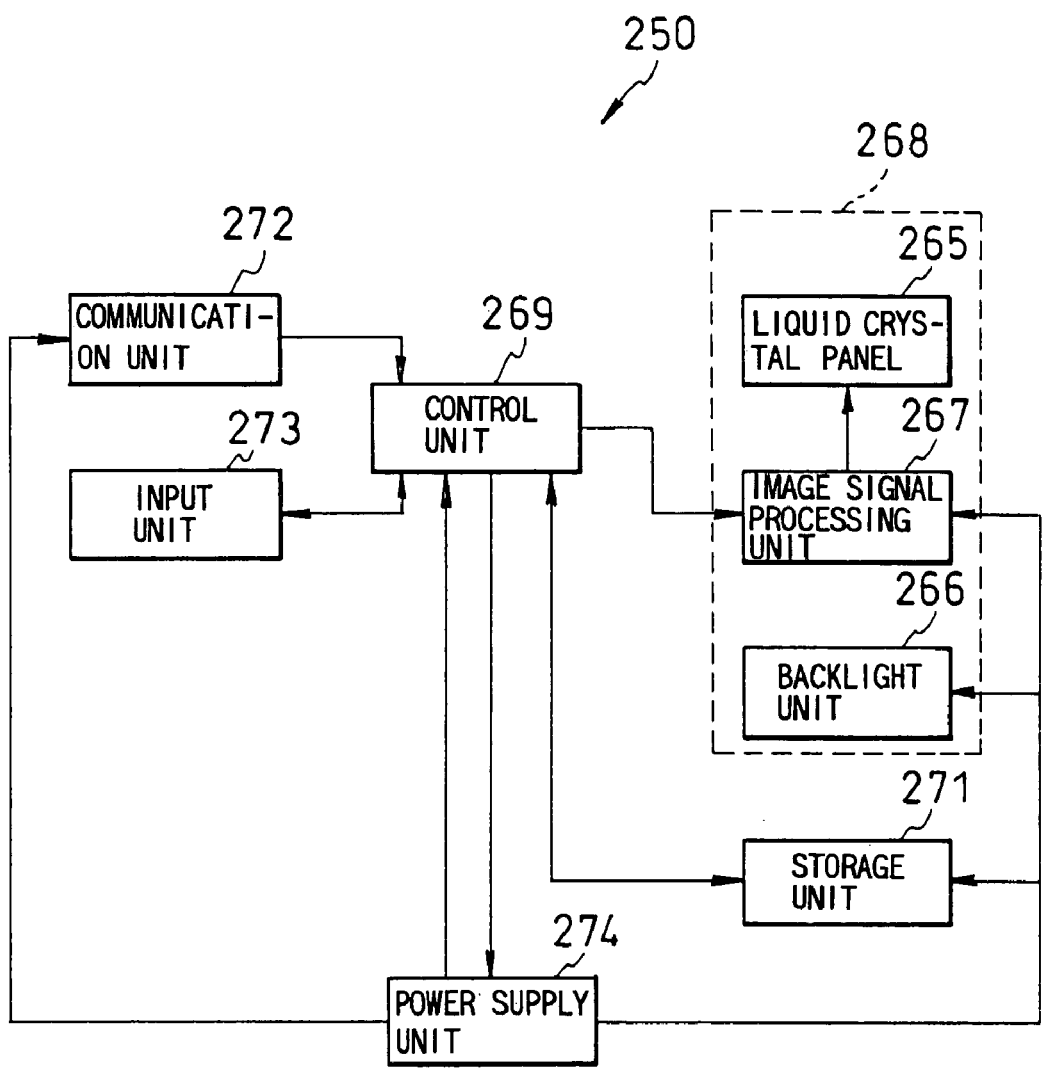
FIG. 24 is a block diagram illustrating the configuration of a portable information terminal constructed in accordance with the embodiment of the present invention.
Figure 25:
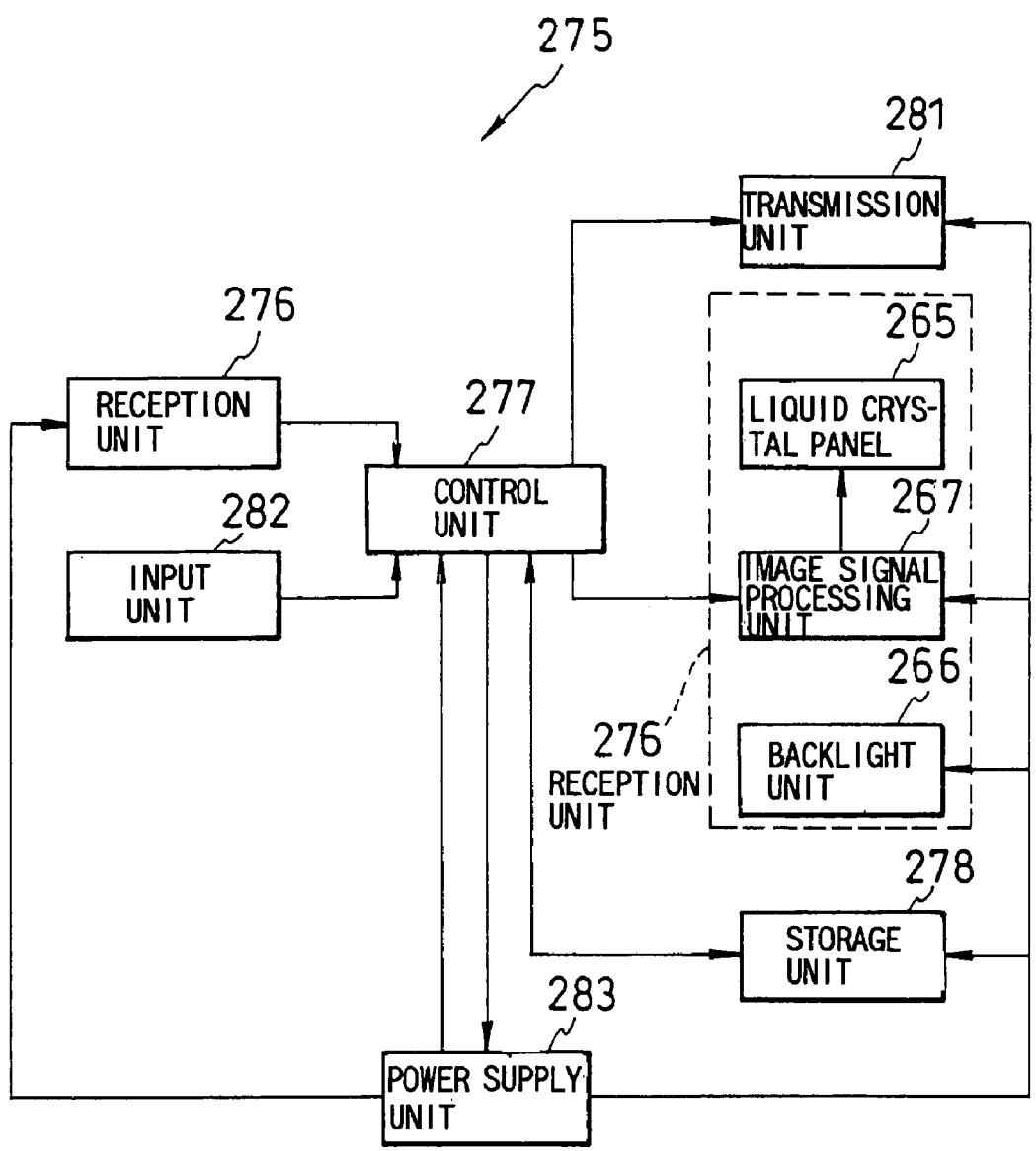
FIG. 25 is a block diagram illustrating the configuration of a portable telephone constructed in accordance with the embodiment of the present invention.

The liquid crystal panel constructed in accordance with those embodiments can be applied to, for example, a monitor of a portable information terminal, a portable telephone, a portable personal computer, a notebook-size personal computer or a disk-top personal computer. FIG. 24 is a block diagram illustrating the configuration of a portable information terminal constructed in accordance with the embodiment of the present invention. In addition, FIG. 25 is a block diagram illustrating the configuration of a portable telephone constructed in accordance with an embodiment of the present invention.

A portable information terminal 250 constructed in accordance with the embodiment of the present invention includes a display unit 268 comprised of a liquid crystal panel 265, a backlight unit 266 and an image signal processing unit 267 for processing an image signal. Furthermore, the portable information terminal 250 includes a control unit 269 for controlling components that constitute the portable information terminal 250, a storage unit 271 for storing programs executed by the control unit 269 and various data, a communication unit 272 for transmitting data to and receiving data from external devices, an input unit 273 comprised such as of a keyboard or a pointer and a power supply unit 274 for supplying power to the components that constitute the portable information terminal 250. Note that the first, second and third embodiments described above are applied to the liquid crystal panel 265.

The portable information terminal 250 thus constructed in accordance with the embodiment is able to display high quality images by creating color balanced viewable images or suppressing pale yellow in color.

A portable telephone 275 constructed in accordance with the embodiment of the present invention includes a display unit 276 comprised of a liquid crystal panel 265, a backlight unit 266 and an image signal processing unit 267 for processing an image signal. Furthermore, the portable telephone 275 includes a control unit 277 for controlling components that constitute the portable telephone 275, a storage unit 278 for storing programs executed by the control unit 277 and various data, a transmission unit 281 for transmitting a radio signal to external devices, an input unit 282 comprised such as of a keyboard or a pointer and a power supply unit 283 for supplying power to the components that constitute the portable telephone 275. Note that the first, second and third embodiments described above are applied to the liquid crystal panel 265.

The portable telephone 275 thus constructed in accordance with the embodiments also is able to display high quality images by creating color balanced viewable images or suppressing pale yellow in color.

As described so far, according to the present invention of claims 1 to 10, as an opening occupying an area varying depending on a color to be displayed is formed in a color filter whereas only one kind of color filter is formed corresponding to each pixel, it is possible for a liquid crystal panel of the present invention to make color reproduction ranges of a reflective display section and a transparent display section substantially coincide with each other within each pixel. This construction of liquid crystal panel makes it possible for a liquid crystal panel to achieve high quality images without increase in process steps for manufacturing a liquid crystal panel. Specifically, in the case where an aperture ratio applied to a color filter that is used to display a green color of high visibility is made maximum, difference in color reproduction ranges of a reflective display section and a transparent display section can further be reduced. Furthermore, according to the present invention of claim 11, as variation in a gap between substrates interposing a liquid crystal therebetween is reduced, pale yellow in color observed in the conventional liquid crystal panel can be reduced.

In addition, according to the method of the present invention of claims 12 and 13, a color liquid crystal panel having such advantages in the construction of color filter can be manufactured.

Moreover, according to the present invention of claims 14 to 16, a color liquid crystal panel having advantageous constructions of color liquid crystal panel described so far can be applied to a color liquid crystal display device.

What is claimed is:

1. A method for manufacturing a color liquid crystal panel, said color liquid crystal panel having plural pixels, each having a thin film transistor therein, a reflective electrode connected to said thin film transistor, and a transparent electrode,
    said color liquid crystal panel being constructed such that a display surface of said color liquid crystal panel allows a light emitted from a backlight to exit from said display surface through said transparent electrode and another light inputted to said display surface to exit from said display surface after being reflected by said reflective electrode,
    said method for manufacturing said color liquid crystal panel comprising the steps of:
    preparing a photomask in such a manner that at least one opening is formed in said photomask so as to vary an area of said at least one opening depending on a color to be displayed; and
    forming a pattern in a raw material film constituting said color filter by using said photomask to make said color filter have at least one opening varying depending on a color to be displayed in a part thereof facing said reflective electrode, the at least one opening in said color filter having an area that is no more than 40% of an area of said reflective electrode.

2. The method for manufacturing a color liquid crystal panel according to claim 1, further having a step of forming a transparent film covering all color filters formed corresponding to colors to be displayed and a step of flattening said transparent film after a step of forming said color filter.

* * * * *